United States Patent
Bent et al.

(10) Patent No.: US 7,668,771 B1
(45) Date of Patent: Feb. 23, 2010

(54) SYSTEM AND METHOD FOR ALLOCATION TO OBTAIN ZERO ACTIVITY IN A SELECTED AGGREGATED ACCOUNT

(75) Inventors: Bruce Bent, Manhasset, NY (US); Bruce Bent, II, New York, NY (US)

(73) Assignee: Island Intellectual Property LLC, New York, NY (US)

( * ) Notice: Subject to any disclaimer, the term of this patent is extended or adjusted under 35 U.S.C. 154(b) by 0 days.

(21) Appl. No.: 11/767,827

(22) Filed: Jun. 25, 2007

Related U.S. Application Data

(63) Continuation of application No. 11/689,247, filed on Mar. 21, 2007.

(60) Provisional application No. 60/892,107, filed on Feb. 28, 2007, provisional application No. 60/895,320, filed on Mar. 16, 2007.

(51) Int. Cl.
*G06Q 40/00* (2006.01)

(52) U.S. Cl. .......................... 705/35; 705/39

(58) Field of Classification Search ................ 235/380; 705/10, 35, 36, 36 R, 38, 39, 40, 42
See application file for complete search history.

(56) References Cited

U.S. PATENT DOCUMENTS

| | | |
|---|---|---|
| 4,232,367 A | 11/1980 | Youden et al. |
| 4,346,442 A | 8/1982 | Musmanno |
| 4,376,978 A | 3/1983 | Musmanno |
| 4,597,046 A | 6/1986 | Musmanno |
| 4,674,044 A | 6/1987 | Kalmus |
| 4,694,397 A | 9/1987 | Grant |
| 4,700,297 A | 10/1987 | Hagel |

(Continued)

FOREIGN PATENT DOCUMENTS

JP  10-049590  2/1998

(Continued)

OTHER PUBLICATIONS

Federal Deposit Insurance Act (12 U.S.C. 1811 et seq.). See at 63 Fed. Reg. 25756, May 11, 1998.*

(Continued)

*Primary Examiner*—James P Trammell
*Assistant Examiner*—B. Joan Amelunxen
(74) *Attorney, Agent, or Firm*—Foley & Lardner LLP

(57) ABSTRACT

A method, program product and system for managing a group of aggregated accounts, each aggregated account held in a different one of a plurality of deposit institutions, each of the aggregated accounts associated with at least one financial entity and holding funds of a plurality of clients of the at least one financial entity, each of the clients having a client asset balance in a respective client account associated with the at least one financial entity, the method comprising: (1) allocating fund deposits to and fund withdrawals from the aggregated accounts, the step of allocating comprising: (a) calculating an aggregated transaction amount based on a total net transaction from among the plurality of the client accounts during a period of time; (b) selecting at least one aggregated account from among the group of aggregated accounts in the different deposit institutions to which to deposit or to withdraw funds based, at least in part, so as to avoid withdrawing funds from or depositing funds to at least a different one of the aggregated accounts in the group; and (2) withdrawing funds from or depositing funds to the at least one of the aggregated accounts based on the allocation.

51 Claims, 10 Drawing Sheets

U.S. PATENT DOCUMENTS

| | | | |
|---|---|---|---|
| 4,751,640 A | 6/1988 | Lucas et al. | |
| 4,774,663 A | 9/1988 | Musmanno et al. | |
| 4,953,085 A | 8/1990 | Atkins | |
| 4,985,833 A | 1/1991 | Oncken | |
| 5,126,936 A | 6/1992 | Champion et al. | |
| 5,206,803 A | 4/1993 | Vitagliano | |
| 5,220,501 A | 6/1993 | Lawlor et al. | |
| 5,235,507 A | 8/1993 | Sackler | |
| 5,262,942 A | 11/1993 | Earle | |
| 5,270,922 A | 12/1993 | Higgins | |
| 5,291,398 A | 3/1994 | Hagan | |
| 5,297,032 A | 3/1994 | Trojan | |
| 5,424,938 A | 6/1995 | Wagner et al. | |
| 5,631,828 A | 5/1997 | Hagan | |
| 5,644,727 A | 7/1997 | Atkins | |
| 5,671,363 A | 9/1997 | Cristofich | |
| 5,689,650 A | 11/1997 | McClelland et al. | |
| 5,710,889 A | 1/1998 | Clark | |
| 5,765,144 A | 6/1998 | Larche | |
| 5,774,880 A | 6/1998 | Ginsberg | |
| 5,781,654 A | 7/1998 | Carney | |
| 5,806,048 A | 9/1998 | Kiron et al. | |
| 5,806,049 A | 9/1998 | Petruzzi | |
| 5,812,987 A | 9/1998 | Luskin | |
| 5,826,243 A | 10/1998 | Musmanno | |
| 5,852,811 A | 12/1998 | Atkins | |
| 5,864,685 A | 1/1999 | Hagan | |
| 5,878,258 A | 3/1999 | Pizi | |
| 5,878,405 A | 3/1999 | Grant et al. | |
| 5,884,285 A | 3/1999 | Atkins | |
| 5,890,141 A | 3/1999 | Carney | |
| 5,893,078 A | 4/1999 | Paulson | |
| 5,903,881 A | 5/1999 | Schrader et al. | |
| 5,905,974 A | 5/1999 | Fraser | |
| 5,940,809 A | 8/1999 | Musmanno | |
| 5,941,996 A | 8/1999 | Smith | |
| 5,946,667 A | 8/1999 | Tull et al. | |
| 5,950,175 A | 9/1999 | Austin | |
| 5,974,390 A | 10/1999 | Ross | |
| 5,978,779 A | 11/1999 | Stein | |
| 6,014,642 A | 1/2000 | El-Kadi et al. | |
| 6,016,482 A | 1/2000 | Molinari | |
| 6,026,438 A | 2/2000 | Piazza | |
| 6,041,314 A | 3/2000 | Davis | |
| 6,044,371 A | 3/2000 | Person | |
| 6,047,324 A | 4/2000 | Ford | |
| 6,049,782 A | 4/2000 | Gottesman et al. | |
| 6,052,673 A | 4/2000 | Leon et al. | |
| 6,088,685 A | 7/2000 | Kiron et al. | |
| 6,092,056 A | 7/2000 | Tull et al. | |
| 6,105,005 A | 8/2000 | Fuhrer | |
| 6,108,641 A | 8/2000 | Kenna | |
| 6,112,191 A | 8/2000 | Burke | |
| 6,119,093 A | 9/2000 | Walker et al. | |
| 6,131,810 A | 10/2000 | Weiss | |
| 6,154,770 A | 11/2000 | Kostakos | |
| 6,189,785 B1 | 2/2001 | Lowery | |
| 6,192,347 B1 | 2/2001 | Graff | |
| 6,226,623 B1 | 5/2001 | Schein et al. | |
| 6,317,783 B1 | 11/2001 | Freishtat et al. | |
| 6,363,360 B1 | 3/2002 | Madden | |
| 6,374,231 B1 | 4/2002 | Bent et al. | |
| 6,513,020 B1 | 1/2003 | Weiss et al. | |
| 6,970,843 B1 | 11/2005 | Forte | |
| 7,089,202 B1 | 8/2006 | McNamar et al. | |
| 7,103,556 B2 | 9/2006 | Del Rey et al. | |
| 7,133,840 B1 | 11/2006 | Kenna et al. | |
| 7,206,761 B2* | 4/2007 | Colvin | 705/35 |
| 7,216,100 B2 | 5/2007 | Elliott | |
| 7,328,179 B2* | 2/2008 | Sheehan et al. | 705/35 |
| 7,376,606 B2 | 5/2008 | Jacobsen | |
| 7,383,223 B1 | 6/2008 | Dilip et al. | |
| 7,440,914 B2 | 10/2008 | Jacobsen | |
| 2001/0032182 A1* | 10/2001 | Kumar et al. | 705/40 |
| 2002/0007330 A1* | 1/2002 | Kumar et al. | 705/36 |
| 2002/0046144 A1 | 4/2002 | Graff | |
| 2002/0069147 A1* | 6/2002 | Sheehan et al. | 705/35 |
| 2002/0082981 A1 | 6/2002 | Madden | |
| 2002/0087454 A1 | 7/2002 | Calo et al. | |
| 2002/0091637 A1 | 7/2002 | Bent et al. | |
| 2002/0128951 A1 | 9/2002 | Kiron et al. | |
| 2002/0161707 A1 | 10/2002 | Cole et al. | |
| 2002/0165757 A1* | 11/2002 | Lisser | 705/10 |
| 2002/0178098 A1* | 11/2002 | Beard | 705/35 |
| 2002/0194099 A1 | 12/2002 | Weiss | |
| 2003/0023529 A1* | 1/2003 | Jacobsen | 705/35 |
| 2003/0041003 A1 | 2/2003 | Kayser | |
| 2003/0135437 A1* | 7/2003 | Jacobsen | 705/35 |
| 2003/0149646 A1 | 8/2003 | Chen et al. | |
| 2003/0163403 A1 | 8/2003 | Chen et al. | |
| 2003/0177092 A1 | 9/2003 | Paglin | |
| 2003/0191702 A1 | 10/2003 | Hurley | |
| 2003/0200174 A1 | 10/2003 | Star | |
| 2003/0236728 A1* | 12/2003 | Sunderji et al. | 705/35 |
| 2004/0039674 A1* | 2/2004 | Coloma | 705/36 |
| 2004/0107157 A1 | 6/2004 | Bleunven et al. | |
| 2004/0111361 A1 | 6/2004 | Griffiths et al. | |
| 2004/0128229 A1* | 7/2004 | Raines et al. | 705/38 |
| 2004/0128235 A1* | 7/2004 | Kemper et al. | 705/39 |
| 2004/0138974 A1 | 7/2004 | Shimamura et al. | |
| 2004/0153398 A1 | 8/2004 | Baumgartner et al. | |
| 2004/0162773 A1* | 8/2004 | Del Rey et al. | 705/36 |
| 2004/0177036 A1 | 9/2004 | Nutahara et al. | |
| 2005/0038737 A1* | 2/2005 | Norris | 705/39 |
| 2005/0044038 A1* | 2/2005 | Whiting et al. | 705/39 |
| 2005/0091137 A1 | 4/2005 | Woeber | |
| 2005/0102225 A1* | 5/2005 | Oppenheimer et al. | 705/38 |
| 2005/0102226 A1* | 5/2005 | Oppenheimer et al. | 705/38 |
| 2005/0108120 A1* | 5/2005 | Malka et al. | 705/35 |
| 2005/0108149 A1* | 5/2005 | Bent et al. | 705/38 |
| 2005/0114246 A1* | 5/2005 | Coloma | 705/35 |
| 2005/0154662 A1* | 7/2005 | Langenwalter | 705/35 |
| 2005/0228733 A1* | 10/2005 | Bent et al. | 705/35 |
| 2006/0047593 A1 | 3/2006 | Naratil et al. | |
| 2006/0106703 A1* | 5/2006 | Del Rey et al. | 705/35 |
| 2006/0149669 A1* | 7/2006 | Kwan | 705/39 |
| 2006/0155644 A1 | 7/2006 | Reid et al. | |
| 2006/0167773 A1 | 7/2006 | Yang et al. | |
| 2006/0213980 A1 | 9/2006 | Geller et al. | |
| 2006/0273152 A1* | 12/2006 | Fields | 235/380 |
| 2007/0043666 A1* | 2/2007 | Burdette | 705/42 |
| 2007/0118449 A1 | 5/2007 | De La Motte | |
| 2007/0255655 A1* | 11/2007 | Kemper et al. | 705/39 |
| 2007/0271174 A2 | 11/2007 | Bent et al. | |
| 2007/0276752 A1* | 11/2007 | Whiting et al. | |
| 2007/0288400 A1* | 12/2007 | Menon | 705/36 R |
| 2008/0015985 A1 | 1/2008 | Abhari et al. | |
| 2008/0046358 A1 | 2/2008 | Holm-Blagg et al. | |
| 2008/0065532 A1* | 3/2008 | De La Motte | 705/39 |
| 2008/0097899 A1 | 4/2008 | Jackson et al. | |
| 2008/0120228 A1 | 5/2008 | Bent et al. | |
| 2008/0133280 A1 | 6/2008 | Ziegler | |
| 2008/0133396 A1 | 6/2008 | De La Motte | |
| 2008/0222053 A1 | 9/2008 | Jacobsen | |
| 2009/0006985 A1 | 1/2009 | Fong et al. | |
| 2009/0012899 A1 | 1/2009 | Friesen | |
| 2009/0043698 A1* | 2/2009 | Jacobsen | 705/39 |
| 2009/0138412 A1 | 5/2009 | Jacobsen | |

FOREIGN PATENT DOCUMENTS

| | | |
|---|---|---|
| WO | WO-95/23379 | 8/1995 |
| WO | WO-99/18529 | 4/1999 |
| WO | WO-02/42952 | 5/2002 |

| | | | |
|---|---|---|---|
| WO | WO 02/42952 | * | 5/2002 |
| WO | WO-2003/012580 | | 2/2003 |
| WO | WO-2005/006111 | | 1/2005 |

OTHER PUBLICATIONS

The Financial Express: Bank Deposit—Does Insurance Scheme keep it secure?, Feb. 8, 2004.*
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Bent, "Bruce Bent Makes Money Market Funds Act Like Bank Accounts," Equity BBDP, Oct. 5, 1998, 3 Sheets.
Blackwell, "New Pitch: Deposit Insurance Sharing," American Banker Online, 4 Sheets, Jan. 21, 2003.
Blackwell, "ABA to Approve System for Sharing Deposit Coverage," American Banker, 2 Sheets, Feb. 11, 2003.
Britt, "Struggling with Sweep Accounts," America's Community Banker, vol. 6, No. 12, 11 Sheets, Dec. 1, 1997.
Chapelle, "Merrill's Rivals Say They, Too. Offer Services Beyond Banking," Securities Data Publishing On Wall Street, 2 Sheets, Feb. 1, 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Hoffman, "Reserve's FDIC-Insured Account Draws Regionals; But some see little need for insurance," Crain Communications Inc., Investment News, 2 Sheets, Jun. 4, 2001.
Keenan, "Tapping Brokerages for Alternative to CDs," American Banker, The Financial Services Daily, 3 Sheets, Feb. 18, 2004.
Lavine, "Check Out High-Yield Checking Accounts," Broward Daily Business Review, vol. 39, No. 102, 2 Sheets, Apr. 27, 1998.
Liberman et al., Market Watch, "How Important are Banks?" FDIC Insurance on Deposits Just One Continuing Advantage, Oct. 17, 2006, 3 Sheets.
McReynolds, "The Power of Cash: Ho-hum cash can be great product (and lead to more business) in troubled times," Securities Data Publishing on Wall Street, 3 Sheets, Jun. 1, 2002.
McReynolds et al. "Unusual Products for Unusual Times," Securities Data Publishing on Wall Street, 6 Sheets, May 1, 2001.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking For Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled http://www.leginfo.ca.gov/pub/bill/asm/ab_2001-2050/ab_2011_bill _20060816_enrolled.html, 2006, pp. 1-3.
AB 2011 Assembly Bill—History, Complete Bill History, http://www.leginfo.ca.gov/pub/bill/asm/ab_2001-2050/ab_2011_bill 20060925_history.html, 2006, p. 1.
AB 2011 Assembly Bill—Bill Analysis, Senate Amendments, http://www.leginfo.ca.gov/pub/bill/asm/ab_2001-2050/ab_2011_cfa_20060811_161755_asm floor.html, 2006, pp. 1-3.
Ab 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp.1-7.
About iMoneyNet, Inc., About iMoneyNet's Money Funds Division, 4 Sheets, Aug. 21, 2003, http://www.ibcdata.com/about.htm.
Announcing Changes in Automatic "Sweep" Investment Options, LPL Financial Services, Linsco/Private Ledger, Member NASD/SIPC, 26 Sheets.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
California Independent Bankers, ICBA Independent Community Bankers of America, Banker Bulletin, 2006, CIB 16th Annual Convention, vol. 4, issue 6, http://www.cib.org/banker_bulletin.htm.
Certificate of Deposit Registry Service: Keeping Deposits in the Corn Patch, Banknews, 2 Sheets. Mar. 2003.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D (6 Sheets).
Heavyweight Funding, Bankers News, Mar. 4, 2003, vol. II, Issue No. 5, 2 Sheets.
Insured Cash Account Program Disclosure Booklet, LPL Financial Services, Linsco/Private Ledger, Member NASD/SIPC.
"Man Bites Dog: Funds Move Into Banking," IBC's Money Fund Selector, 2 Sheets, Nov. 6, 1998.
Mutual Funds Magazine, Bargain Basement Funds, Oct. 1997, 2 Sheets.
Mutual Funds Magazine, Bargain Basement Funds, Oct. 1997, 1 Sheet.
Mutual Funds Magazine, Bargain Basement Funds, Oct. 1997, 1 Sheet.
Money Fund Report, IBC Financial Data, Inc., Nov. 6, 1998, 1 Sheet.
News Article: "Regulators Support Demand Deposit Bill", Regulatory Compliance Watch—Mar. 9, 1998; 2 Sheets, vol. 9, No. 10.
Promontory Interfinancial Network: http://www.promnetwork.com/index.html, 2003.
Reserve Insured Deposits, United States Patent and Trademark Office, Reg. No. 2,694,910, Registered Mar. 11, 2003, 1 Sheet.
Reserve Management Corporation, Reserve Insured Deposits, Serial No. 76/315,600, Issued.
"Reverse Ups Insurance Limit On Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
The Reserve Fund, Study of U.S. Patent No. 6,374,231, 1 Sheet.
The Reserve, "What Sets Us Apart," 2 Sheets, Oct. 4, 2006, http://www.ther.com/bank/bank_wsua.shtml.
The Reserve, "Reserve Insured Deposits," 2 Sheets, Oct. 4, 2006, http://www.ther.com/ps/ps_fif.shtml.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.

The Reserve Funds Press Release, "The Reserve Funds and Frontier Bank Partner to Offer Revolutionary Banking Product," 5 Sheets, Aug. 1, 2000.
Capital Briefs: Corporate Checking Account Relief Sought, American Banker, vol. 162, Jul. 28, 1997, 1 Sheet.
U.S. Appl. No. 60/307,815, filed Jul. 27, 2001.
U.S. Appl. No. 60/323,365, filed Sep. 20, 2001.
12 CFR Part 329—Interest on Deposit, Source: 51 FR 10808, Mar. 31, 1986, 5 Sheets.
Merriam-Webster Online Dictionary, 10th Edition, Definition of "Associated", 2 Sheets.
Merrill Lynch & You, "Financial Services The Way You Want, When You Want Them," Jan. 2000 4 Sheets.
Merrill Lynch, Pierce, Fenner & Smith Incorporated, "Information Statement," 2000, 12 Sheets.
Lawsuit by *Island Intellectual Property LLC, Lids Capital LLC, and Double Rock Corporation* against *Promontory Interfinancial Network, LLC and MBSC Securities Corporation*, including Cover Sheet, Summons, Complaint and Rule 7.1 Statement, Mar. 24, 2009, Case No. 09 CV 2675.
Lawsuit by *Island Intellectual Property LLC, Lids Capital LLC, and Double Rock Corporation* against *Deutsche Bank AG, Deutsche Bank Trust Company Americas and Total Bank Solutions, LLC*, including Cover Sheet, Summons, Complaint and Rule 7.1 Statement, Mar. 24, 2009, Case No. 09 CV 2677.
Lawsuit by *Promontory Interfinancial Network, LLC* against *Double Rock Corporation p/k/a Reserve Management Corporation*, Complaint, Mar. 24, 2009, Civil Action No. 1:09 CV 316.
Lawsuit by *Promontory Interfinancial Network, LLC* against *Double Rock Corporation p/k/a Reserve Management Corporation and Lids Capital LLC*, Amended Complaint, Mar. 27, 2009, Civil Action No. 1:09 CV 316.
Lawsuit by *Island Intellectual Property LLC, Lids Capital. LLC, Double Rock Corporation and Intrasweep LLC*, against *Promontory Interfinancial Network, LLC, Deutsche Bank AG, Deutsche Bank Trust Company Americas and Total Bank Solutions, LLC*, Complaint, Apr. 14, 2009, Case No. 09 CV 3750.
Lawsuit by *Promontory Interfinancial Network, LLC* against *Double Rock Corporation, p/k/a Reserve Management Corporation, Island Intellectual Property LLC and Lids Capital LLC*, including Cover Sheet, Summons and Complaint, Apr. 14, 2009, Civil Action No. 3:09 CV 217.
Lawsuit by *Promontory Interfinancial Network, LLC* against *Double Rock Corporation p/k/a Reserve Management Corporation, Island Intellectual Property LLC, Lids Capital LLC and Intrasweep LLC*, Amended Complaint, Apr. 15, 2009, Civil Action No. 3:09 CV 217.
CMA, Insured Savings Account Fact Sheet, Merrill Lynch, Pierce, Fenner & Smith Incorporated, 1997, pp. 49-57.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Merrill Lynch, Pierce, Fenner & Smith Incorporated, Jan. 1997, 35 Sheets.
Deposit Growth Strategies for Financial Institutions, New Sweep Account Helps Retain $40 Million in Business Deposits, vol. 7, No. 12, The Reserve Funds, May 2001, 1 Sheet.
FDIC, Federal Deposit Insurance Corporation, Letter to Mr. Ronald Rexter, Feb. 28, 2003, From Michelle M. Borzillo, Counsel Supervision and Legislation Section, 2 Sheets.
Financial Services Industry, "Web Watch: Trading Company Bundles CDs For Better Rates," Community Banker, Jun. 2002, online, http://findarticles.com/p/articles/mi_qa5344/is_200206/ai_n21313883/.
FINISTAR, Providing FDIC Insured Funds as a Stable Source of Deposits to Commercial Banking Institutions, 16 Sheets, www.Finistar.com.
Frost Bank, Member FDIC, Checking Accounts, 1 Sheet, Sep. 19, 2003, https://www.frostbank.com/cgi-bin/ecomm/frost1/scripts/products/product_detail.jsp?BV_. . . .
In The Know, Important Information About Your Account, Smith Barney Citigroup, 2005, 6 Sheets.
Letter From Joseph A. DiNuzzo, Counsel, Oct. 20, 1999, FDIC, Federal Deposit Insurance Corporation, 1 Sheet.

Letter From Roger A. Hood, Assistant General Counsel, Jul. 16, 1986, FDIC, Federal Deposit Insurance Corporation, Legal Division, 1 Sheet.
Merrill Lynch Announces Beyond Banking, The Power of Advice For Smarter Cash Management, Jan. 8, 2 Sheets.
Merrill Moves CMA Cash to Bank, Street Talk, On Wall Street, Nov. 2000, p. 26.
Money Fund Report, Bank of New York Adds Insured Sweeps Option, Friday, May 3, 2002, The Reserve Funds, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
O'Brian, "Money-Market Funds Suit Many Investors, But Proud Creator Frets About Extra Risk," Re-Printed From The Wall Street Journal, Monday, Nov. 6, 2000, Dow Jones & Company, Inc., 2 Sheets.
On Wall Street, Helping Brokers Build A More Successful Business, The Power of Cash, Jun. 2002, 2 Sheets.
On Wall Street, Helping Brokers Build A More Successful Business, Unusual Products For Unusual Times, May 2001, 2 Sheets.
Online, www.usabancshares.com, Brave New World, 1999, 2 Sheets.
Sweeping Your Firm Into FDIC Insured Deposits, Harken Financial Services, Aug. 4, 2006, 8 Sheets.
Testimony of Bruce R. Bent, CEO of The Reserve Funds, Before The Financial Institutions and Consumer Credit Subcommittee House Financial Services Committee U.S. House of Representative, Hearing On H.R. 758 and H.R. 859, Mar. 5, 2003, 4 Sheets.
The Depository Trust Company, B#: 3875, Oct. 1, 2002, Settlement\Underwriting, From: Denise Russo, Director, Underwriting, 6 Sheets.
The Reserve Funds, NJBA Endorses New Sweep Account Offers New Jersey Banks Deposit Growth, Retention, For Immediate Release, May 23, 2001, 1 Sheet.
The Reserve Funds, Reserve Management and Irwin Union Bank and Trust Company Partner to Offer The Reserve Return Sweep, For Immediate Release, Mar. 8, 2001, 2 Sheets.
The Unmatched Sweep Solution From The Cash Management Expert, 2 Sheets.
Waddell, "Sweeping Clean," Advisor, The Advisor to Advisors, 2 Sheets.
Merrill Lynch & You, "Financial Services The Way You Want, When You Want Them," Jan. 2000 4 Sheets.
Merrill Lynch, Pierce, Fenner & Smith Incorporated, "Information Statement," 2000, 12 Sheets.
Ring, National /Global, "Amex Spans The Globe in Retail Bank Buildup," Nov. 27, 2000, 1 Sheet.
The Reserve Funds, Objectives, Observations & Strategies For American Enterprises Inv., Oct. 18, 2000, 11 Sheets.
Lake Forest Bank & Trust Company, Introducing MaxSafe Deposit Accounts with up to $3.75 Million in FDIC Insurance, www.lakeforestbank.com/maxsafe, 2 Sheets.
Lawsuit by *Island Intellectual Property LLC, Intrasweep LLC and Double Rock Corporation* against *Deutsche Bank AG, Deutsche Bank Trust Company Americas and Total Bank Solutions, LLC*, Complaint for Patent Infringement, May 19, 2009, Case No. 09 CV 4673.
Lawsuit by *Promontory Interfinancial Network, LLC* against *Double Rock Corporation p/k/a Reserve Management Corporation, Island Intellectual Property LLC, Lids Capital LLC and Intrasweep LLC*, Complaint, May 19, 2009, Civil Action No. 3:09 CV 322.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Answer and Counter Claims, Answer of Defendant MBSC Securities Corporation,, Jun. 25, 2009, Case No. 09 CV 2675.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and*

*Total Bank Solutions, LLC*, Answer and Counter Claims, Answer of Defendant Promontory Interfinancial Network, LLC, Jun. 25, 2009, Case No. 09 CV 2675.

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Deutsche Bank AG's Answer To Consolidated First Amended Complaint, Jun. 25, 2009, Civil Action No. 09 CIV 2675.

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Deutsche Bank Trust Company Americas' Answer To Consolidated First Amended Complaint and Counter Claims, Jun. 25, 2009, Civil Action No. 09 CIV 2675.

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Total Bank Solutions, LLC's Answer To Consolidated First Amended Complaint and Counter Claims, Jun. 25, 2009, Civil Action No. 09 CIV 2675.

Dreyfus Insured Deposit Program, Disclosure Statement and Terms and Conditions, Dreyfus A BNY Mellon Company, 8 Sheets.

Dreyfus Insured Deposit Program, Multiple List Program—Effective May 11, 2009, 1 Sheet.

Introducing our MaxSafe CD with up to $700,000 of FDIC Insurance, 4 Sheets.

Finistar, Registration No. 2,939,558, Registered Apr. 12, 2005.

Seven Times the Security of a Normal CD, Introducing our MaxSafe CD, 4 Sheets.

The Pershing Press, Dreyfus Insured Deposit Program, Issue 2, Aug. 2008, http://www.pershing.com/news/pershing_press/news_466244.html, 1 Sheet.

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.

Letter From Colleen Curran Harvey, Deputy Chief Counsel, Jan. 8, 1985; Letter From Merle Y. Waldman, Nov. 14, 1984; Letter From Merle Y. Waldman. Sep. 24, 1984; Letter From Merle Y. Waldman, Aug. 8, 1984, LEXSEE 1985 Sec No- Act., Lexis 1593, Securities Exchange Act of 1934—Section 15(a), 11 Sheets.

The Insured Savings Account, Issuer Guide to Offering MMDAs Through Merrill Lynch, Merrill Lynch Money Markets, Inc., "Operational Guide To The Merrill Lynch MMDA Program 1986", Sep. 1986 3 Sheets.

FDIC Federal Register Citations: Email from Bert Ely to Comments, Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.

Letter To Mr. Jonathan L. Levin, Esq., From Oliver Ireland, Associate General Counsel, Oct. 18, 1996, 2 Sheets.

Letter To Mr. L.P. Fleming, Jr., Esq., From Oliver Ireland, Associate General Counsel. Feb. 7, 1995, 3 Sheets.

Letter To Mr. James E. Creekman, Group Vice President, From Oliver Ireland, Associate General Counsel, Aug. 1, 1995, 4 Sheets.

Letter To Ms. Brenda L. Skidmore, Senior Vice President, From Oliver Ireland, Associate General Counsel, Aug. 30, 1995, 4 Sheets.

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.

U.S. Appl. No. 60/307,815, filed Jul. 27, 2001.

U.S. Appl. No. 60/323,365, filed Sep. 20, 2001.

Letter From William W. Wiles, Secretary of the Board, Board of Governors of the Federal Reserve System, Jun. 22, 1983, 6 Sheets.

DI 48, Excerpts of Transcript of Hearing, U.S. Dist. Ct., District of Delaware, Civil Action No. 82-680, Apr. 8, 1983, 5 sheets.

DI 56, Interrog. Response. U.S. Dist. Ct. District of Delaware, Civil Action No. 82-680, May 20, 1983, 15 Sheets.

DI 99, Suppl. Interrogatory Response, U.S. Dist. Ct., District of Delaware, Civil Action No. 82-630, May 30, 1984, 6 Sheets.

Letter from Michael Bradfield. General Counsel, Board of Governors of the Federal Reserve System, Nov. 16, 1984, 4 Sheets.

Board of Governors of the Federal Reserve System, 1984 Fed. Res. Interp. Ltr. LEXIS 56, Nov. 16. 1984. 3 Sheets.

Letter From Oliver I. Ireland, Associate General Counsel, Board of Governors of the Federal Reserve System, Jun. 22, 1988, 5 Sheets.

Board of Governors of the Federal Reserve System, 1988 Fed. Res. Interp. Ltr. LEXIS 141. Jun. 22. 1988, 3 Sheets.

Board of Governors of the Federal Reserve System, 1989 Fed. Res. Interp. Ltr. LEXIS 77, Mar. 14, 1989, 2 Sheets.

Board of Governors of the Federal Reserve System, 1989 Fed. Res. Interp. Ltr. LEXIS 154, Jun. 21, 1989, 2 Sheets.

Board of Governors of the Federal Reserve System, 1990 Fed. Res. Interp. Ltr. LEXIS 94, Feb. 1, 1990, 1 Sheet.

Board of Governors of the Federal Reserve System, 1991 Fed. Res. Interp. Ltr. LEXIS 232. Jan. 30, 1991, 2 Sheets.

CMA, The Merrill Lynch Cash Management Account Financial Service, Insured Savings Account Participating Depository Institutions, Merrill Lynch, Pierce, Fenner & Smith Incorporated, Nov. 1992, 2 Sheets.

Board of Governors of the Federal Reserve System, 1994 Fed. Res. Interp. Ltr. LEXIS 156, Jun. 24, 1994, 3 Sheets.

CMA, Insured Savings Account Fact Sheet, Merrill Lynch, Pierce, Fenner & Smith Incorporated, Jul. 1994, pp. 47-54.

Board of Governors of the Federal Reserve System, 1994 Fed. Res. Interp. Ltr. LEXIS 314, Oct. 17, 1994, 2 Sheets.

Board of Governors of the Federal Reserve System. 1994 Fed. Res. lnterp. Ltr. LEXIS 419, Oct. 14, 1994, 4 Sheets.

CMA, The Merrill Lynch Cash Management Account Financial Service, Insured Savings Account Participating Depository Institutions. Merrill Lynch, Pierce, Fenner & Smith Incorporated, Mar. 1995, 2 Sheets.

Letter from Stephanie Martin, Assoc. General Counsel, Board of Governors of the Federal Reserve System, Apr. 22, 2004, 8 Sheets.

Bank Deposit Program, Online http://web.archive.org/web/20030620100115/http:/www.smithbarney.com/products_servi, Jan. 19, 2001, 4 Sheets.

Federal Register: Oct. 9, 1997 (vol. 62, No. 196), pp. 52809-52868, http://www.fdic.gov/news/news/inactivefinancial/1997/fil97111b.html.

Garmhausen, "Matching Small Banks with Large Muni Deposits," American Banker, Online The Financial Services Resource, Oct. 4, 2005, 4 pages, http://www.finstar.com/docs/AmericanBanker.html.

Lawsuit by *Carlo DeBlasio et al.* against *Merrill Lynch & Co., Inc. et al.*, Second Amended Class Action Complaint, Jury Trial Demanded, Introduction and Summary of Allegations, Jun. 11, 2007, Case No. 07-cv-318-VM.

Lawsuit by *Carlo DeBlasio et al.* against *Merrill Lynch & Co., Inc. et al.*, Declaration of Andrew W. Stern, including Exhibits A, B, C, D, E and F, Nov. 11, 2007, Case No. 07-cv-318 (RJS) (Document 59).

Lawsuit by *Carlo DeBLasio et al.* against *Merrill Lynch & Co., Inc. et al.*, Declaration of Scott D. Musoff in Support of The Merrill Lynch Defendants' Motion to Dismiss The Second Amended Class Action Complaint, ECF Case, Nov. 12, 2007, Case No. 07-cv-318 (RJS) (Document 64).

Lawsuit by *Carlo DeBlasio et al.* against *Merrill Lynch & Co., Inc. et al.*, Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14, 2007, Case No. 07-318 (RJS) (Document 67).

Lawsuit by *Carlo DeBlasio et al.* against *Merrill Lynch & Co., Inc. et al.*, Declaration of Kenneth I. Schacter, including Exhibits A, B, C, D, F, G, H, 1, J, K, L, M, N, 0, P, Q and R, Nov. 14, 2007, Case No. 07-cv-318 (RJS) (Document 69).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion For Dismissal of the Second Amended Class Action Complaint, Including: "Client Commitment"; "Get Started Today"; "Total Merrill"; "Guideline For Business Conduct"; "Commitment To Clarity"; "Cash Management Account"; "Information Statement Regarding Changes To Interest Rates On Deposits in Merrill Lynch Banks"; "Client Relationship Agreement"; "Cash Management Account"; "Recent Yields on Bank Deposit and Certain Investment Alternatives"; "Uniform Application For Investment Advisor Registration"; "Excerpts From Merrill Lynch & Co., Inc. Form 10-K For The Year-Ended Dec. 29, 2006"; Merrill Lynch Account Statement For Silverman Family Trust For The Period Dec. 30, 2006 Though Jan. 31, 2007, ECF Case, Feb. 5, 2008, Case No. 07-cv-318 (RJS) (Document 71).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion For Dismissal of the Second Amended Class Action Complaint, Including: "Global Wealth Management", "Your Financial Advisor", "Working Together", "Our Statement of Commitment to Investors", "Morgan Stanley Code of Ethics and Business Conduct", "Code of Ethics and Business Conduct", "Active Assets Account", "Keep Your Money Working with Practical Investment Features", "Bank Deposit Program Disclosure Statement, Mar. 2006", "Uniform Application for Investment Advisor Registration", "Excerpts from Morgan Stanley's Form 10-K for the year-ended Nov. 30, 2005, filed with the SEC, referenced in ¶ 163 of the SAC", "Excerpts from Morgan Stanley's Form 10-K for the year-ended Nov. 30, 2005, filed with the SEC, referenced in ¶¶ 163-64 of the SAC", ECF Case, Feb. 5, 2008, Case No. 07-cv-318 (RJS) (Document 72).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion For Dismissal of the Second Amended Class Action Complaint, Including: "Working with Your Financial Advisor", "Managing Your Wealth", "Wealth Management", "Account Services Financial Management Account", Our Mutual Commitment, "Make your Money Work Harder", "Bank Deposit Program", "Q&A Important Information about Changes to the BDP and to Sweep Options", "Smith Barney Account Application", "Important New Account Information", "Uniform Application for Investment Advisor Registration", "Excerpts from Citigroup, Inc. 's Form 10-K for the year-ended Dec. 31, 2004, filed with the SEC", Feb. 5, 2008, Case No. 07-cv-318 (RJS) (Document 73).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion For Dismissal of the Second Amended Class Action Complaint, Including: "Investing—Why Choose Wachovia Securities?", "Why Choose Wachovia Securities?", "Life Event Planning", "Investment Choices", "Invest with an Advisor", "Our Advisory Process", "Brokerage Accounts", "Full-Service Brokerage", "Command Asset Program", "Client Commitment", "Uncompromising Integrity", "Cash Sweep Program Disclosure Statement", "Schedule of Fees Effective Jan. 1, 2007", "Uniform Application for Investment Advisor Registration", "Excerpts from Wachovia Corporation's annual report for the year-ended Dec. 31, 2004, filed with the SEC on Form 10-K", Feb. 5, 2008, Case No. 07-cv-318 (RJS) (Document 74).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion For Dismissal of the Second Amended Class Action Complaint, Including: "Letter from Mr. Charles Schwab", "Letter from the Chief Executive Officer", "From the CEO", "Why Schwab", "Personal Relationship", "Great Value", "Investment Products", "Code of Business Conduct and Ethics", "CDs and Money Markets", "CDs and Money Markets—Cash Solutions", "Sweep and Interest Services", "Daily Cash", "Schwab One Interest Feature", "Disclosure Statement for Schwab Cash Features", "Representatives' Compensation", "Cash Sweep Disclosure Statement for Individual Investors", "Schwab One Brokerage Account Application", "Uniform Application for Investment Advisor Registration", "Excerpts from The Charles Schwab Corporation annual report on Form 10-K filed with the SEC for the year-ended Dec. 31, 2006", Feb. 5, 2008, Case No. 07-cv-318 (RJS) (Document 75).

Lawsuit by *Carlo DeBLasio et al.* against *Merrill Lynch & Co., Inc. et al.*, Supplemental Declaration of Matthew J. Terry in Support of Motion to Dismiss by Defendants Wachovia Corp., Wachovia Securities, LLC, Wachovia Bank N.A., and Wachovia Bank of Delaware, N.A., including Exhibits A and B, Mar. 6, 2008, Case No. 07-cv-318 (RJS) (Document 79).

Lawsuit by *Carlo DeBlasio et al.* against *Merrill Lynch & Co., Inc. et al.*, Reply Declaration of Kenneth Schacter including Exhibits S and T, Mar. 6, 2008, Case No. 07-cv-318 (RJS) (Document 81).

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Consolidated First Amended Complaint, Jury Trial Demanded, Jun. 11, 2009, Civil Action No. 09 CIV 2675 (VM) (Document 16).

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant MBSC Securities Corporation's Counterclaims, Jul. 9, 2009, Civil Action No. 09 CIV 2675 (VM) (Document 34).

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Promontory Interfinancial Network LLC's Counterclaims, Jul. 9, 2009, Civil Action No. 09 CIV 2675 (VM) (Document 35).

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Deutsche Bank Trust Company Americas' Counterclaims, Jul. 9, 2009, Civil Action No. 09 CIV 2675 (VM) (Document 36).

Lawsuit by *Island Intellectual Property LLC Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Total Bank Solutions, LLC's Counterclaims, Jul. 9, 2009, Civil Action No. 09 CIV 2675 (VM) (Document 37).

* cited by examiner

SYSTEM AND METHOD FOR ALLOCATION TO OBTAIN ZERO ACTIVITY IN A SELECTED AGGREGATED ACCOUNT

RELATED APPLICATIONS

This application is a Continuation of U.S. application Ser. No. 11/689,247, filed on Mar. 21, 2007, which claims the priority and hereby incorporates all of the subject matter of provisional application 60/895,320, filed on Mar. 16, 2007. This application claims the priority and hereby incorporates all of the subject matter of provisional application 60/892,107, filed on Feb. 28, 2007. This application is related to U.S. Pat. No. 6,374,231 of Apr. 16, 2002 entitled "Extended Coverage Monetary Regulation System", and U.S. application Ser. No. 10/071,053, filed on Feb. 8, 2002, U.S. application Ser. No. 09/677,535, filed on Oct. 2, 2000, and U.S. application Ser. No. 11/149,278, filed on Jun. 10, 2005, the disclosures of which are hereby incorporated by reference as if fully set forth herein.

FIELD OF THE INVENTION

The present invention generally relates to a system and method for managing aggregated accounts.

BACKGROUND OF THE INVENTION

Securities brokerage cash management systems, such as the system disclosed in U.S. Pat. No. 4,774,663 to Musmanno et al. ("the Musmanno"), are useful in managing data processing and information between securities brokerage accounts, individual deposit accounts and deposit institutions. The Musmanno, for example, discloses a system in which subscriber expenditures, such as charge card use, check and/or cash advances are applied on a hierarchical basis against the subscriber's free credit balance, short term investment and the lendable equity in the subscriber's securities account. On a periodic basis, received card charges, check, securities and deposit transactions for the account participants are verified and employed to compute an updated credit limit for each subscriber. Other accounting systems, such as the system disclosed in U.S. Pat. No. 5,893,078 to Paulson, are primarily directed to managing sweep transactions, in which a bank account sweeps any unused funds into a higher-interest earning account.

However, these cash management systems are not capable of monitoring and managing aggregate activity between banks, financial entities and individual financial entity clients. In particular, these known systems are not flexible enough to operate within the varying confines of diverse financial programs and products, and manage data relating to financial entities, clients and/or banks working under these programs and products. The conventional system structure also does not allow for easy computation of individual client account balances, interest payments, deposits and withdrawals.

It should be noted that as of the date of this filing, at least the assignee Reserve Management Corporation (aka "The Reserve"), offers the ability for customer financial institutions such as broker dealers to offer FDIC insurance over the $100,000 FDIC limit for client accounts thereat by distributing the funds to a plurality of aggregated accounts at a plurality of different deposit institutions.

Accordingly, there is a need for a system and method for managing aggregated investment accounts that allows for easy settlement of and computation of net activity for each account, while also providing efficient reporting of data relating to the accounts to financial entities and deposit institutions.

SUMMARY OF THE INVENTION

According to an exemplary embodiment of the present invention, a method is provided for managing a group of aggregated accounts, each aggregated account held in a different one of a plurality of deposit institutions, each of the aggregated accounts associated with at least one financial entity and holding funds of a plurality of clients of the at least one financial entity, each of the clients having a client asset balance in a respective client account associated with the at least one financial entity, comprising: (1) allocating fund deposits to and fund withdrawals from the aggregated accounts, the step of allocating comprising: (a) calculating an aggregated transaction amount based on a total net transaction from among the plurality of the client accounts during a period of time; (b) selecting at least one aggregated account from among the group of aggregated accounts in the different deposit institutions to which to deposit or to withdraw funds based, at least in part, so as to avoid withdrawing funds from or depositing funds to at least a different one of the aggregated accounts in the group; and (2) withdrawing funds from or depositing funds to the at least one of the aggregated accounts based on the allocation.

In a further embodiment, the selecting step is performed at least in part by determining a relationship between a respective amount of net assets in one of the at least one of the aggregated accounts in the group of aggregated accounts and a respective minimum deposit cap.

In a further embodiment, the selecting step is performed at least in part by determining a relationship between respective net assets in each of a plurality of the aggregated accounts and a respective minimum deposit cap associated with each of the plurality of the respective aggregated accounts.

In a further embodiment, the selecting step selects a plurality of the aggregated accounts from among the group of aggregated accounts to which to deposit or to withdraw funds.

In a further embodiment, the selecting step further selects deposit institutions based, at least in part, on determining a relationship between the respective amount of net assets in the at least one aggregated account held at one of the financial entities of the group and both the respective minimum deposit cap and a respective maximum deposit cap.

In another embodiment, the selecting step selects deposit institutions based, at least in part, on determining a relationship between the respective amount of net assets in each of the plurality of aggregated accounts and both the respective minimum deposit cap and a respective maximum deposit cap.

In a further embodiment, the selecting step selects a plurality of the aggregated accounts from among the group of aggregated accounts to which to deposit or to withdraw funds.

In a further embodiment, the allocating step comprises allocating a respective amount to one of the at least one aggregated accounts based at least in part on the relationship between the respective amount of net assets in the one aggregated account held at that deposit institution and the respective minimum deposit cap.

In a further embodiment, the allocating respective amount step allocates an amount to the one aggregated account based, at least in part, on the relationship between the respective amount of net assets in the at least one aggregated account and both the respective minimum deposit cap and the respective maximum deposit cap for that aggregated account in that deposit institution.

In a further embodiment, the relationship is whether the amount of net assets in the at least one aggregated account is below the respective minimum cap.

In a further embodiment, the relationship comprises whether the amount of net assets in the one aggregated account held at that deposit institution is below the respective minimum cap, and further comprises, if these net assets are above the respective minimum cap, whether the amount of net assets in the aggregated account held at that deposit institution is below the respective maximum cap.

In a further embodiment, the relationship is how far the net assets in the one aggregated account held at that respective deposit institution are below or above the respective minimum cap.

In a further embodiment, the relationship comprises how far the amount of net assets in the one aggregated account held at that deposit institution is below the respective minimum cap, and further comprises, if these net assets are above the minimum cap, how far the net assets in the aggregated account held at that deposit institution is below the respective maximum cap.

In a further embodiment, the allocating step comprises selecting the at least one deposit institution to which to deposit or to withdraw funds based, at least in part, on one or more rules.

In a further embodiment, one rule of the one or more rules comprises limiting a number of withdrawals from each of the aggregated accounts in the group over a time period to a predetermined number.

In another embodiment, the allocating amounts step comprises allocating the respective amounts to the at least one aggregated account based, at least in part, on one or more rules.

In a further embodiment, a step is provided of allocating client asset balances in the client accounts among a plurality of the aggregated accounts in the group to match the allocation of funds.

In a further embodiment, a step is provided of allocating client asset balances in the client accounts associated with the one financial entity among one or more of the aggregated accounts based, at least in part, on one or more rules.

In a further embodiment, one rule of the one or more rules comprises limiting net assets of a client in at least one of the aggregated accounts in the group held at a given deposit institution to less than a predetermined amount.

In a further embodiment, the allocating client asset balances in the client accounts among a plurality of the aggregated accounts is performed only one time per day to substantially match the most recent allocation of funds.

In a further embodiment, a step is provided of allocating client asset balances in the client accounts associated with the one financial entity among one or more of the aggregated accounts based, at least in part, on one or more rules.

In a further embodiment, one rule of the one or more rules comprises limiting net assets of a client in at least one of the aggregated accounts in the group held at a given deposit institution to less than a predetermined amount.

In a further embodiment, the allocating client asset balances in the client accounts among a plurality of the aggregated accounts is performed only one time per day to substantially match the most recent allocation of funds.

In a further embodiment, a step is provided of allocating client asset balances in the client accounts among a plurality of the aggregated accounts in the group to match the allocation of funds.

In a further embodiment, a step is provided of allocating client asset balances in the client accounts associated with the one financial entity among one or more of the aggregated accounts based, at least in part, on one or more rules.

In a further embodiment, the calculating an aggregated transaction amount comprises: receiving a sweep file associated with the at least one financial entity, the sweep file comprising fund deposits and/or fund withdrawals from a plurality of the client accounts associated with the at least one financial entity; posting the fund deposits and/or the fund withdrawals and any other instructions in said sweep file associated with the plurality of client accounts of the at least one financial entity; and determining the total net transaction for the sweep file.

In a further embodiment, the minimum cap is a cap negotiated with the depository institution.

In a further embodiment, at least one of the aggregated accounts held at one of the deposit institutions associated with the at least one financial entity has its respective maximum deposit cap set equal to its respective minimum deposit cap, and wherein the step of selecting further comprises by-passing withdrawals and deposits of funds for the at least one aggregated account that has its respective maximum deposit cap set equal to its respective minimum deposit cap if the net assets for this aggregated account are substantially equal to or greater than the minimum cap for that aggregated account.

In a further embodiment, for each aggregated account in which the maximum deposit cap is equal to the minimum deposit cap and the net assets are substantially equal to the minimum or the maximum deposit cap, the step of allocating further comprises offsetting withdrawals from this aggregated account with deposits from another aggregated account associated with the at least one financial entity held at a different deposit institution in which its respective maximum deposit cap is not equal to its respective minimum deposit cap.

In a further embodiment, the plurality of client accounts is associated with a program, and wherein the step of withdrawing funds further depends on predefined program rules associated with the program, the predefined program rules comprising rules relating to one or more of the following: level of FDIC insurance provided by the program, total client account balance, the one or more deposit institutions attached to the client account and the client account balance at each deposit institution, and whether or not the client has chosen to opt out of one or more of the deposit institutions.

In a further embodiment, the step of allocating comprises a step of, for the at least one financial entity, reporting information regarding a net transaction activity associated with the client accounts of the at least one financial entity.

In a further embodiment, the step of reporting comprises generating a deposit institution allocation report comprising information regarding one or more of the following: an amount of the net transaction activity required for the corresponding deposit institution, and a reason for the net transaction activity required for the corresponding deposit institution.

In a further embodiment, the step of allocating comprises a step of approving the information regarding the net transaction activity.

In a further embodiment, the step of approving comprises collecting reported financial institution periodic activity data from each financial institution; and reconciling inconsistencies between reported deposit institution periodic activity data and observed deposit institution periodic activity data.

In a further embodiment, the step of allocating comprises a step of notifying each deposit institution of any allocation thereto.

In a further embodiment, for each deposit institution where a withdrawal allocation is to be made, the step of notifying comprises steps of generating and sending a message to the deposit institution in one of the following manners: in person, by mail, by automated teller machine, and using the telephone and distributing by mail and messenger service.

In a further embodiment, the selecting step determines if there is a data field that indicates whether to avoid withdrawing funds from or depositing funds to the different one of the aggregated accounts.

In a further embodiment, a system is provided for managing a group of aggregated accounts, each aggregated account held in a different one of a plurality of deposit institutions, each of the aggregated accounts associated with at least one financial entity and holding funds of a plurality of clients of the at least one financial entity, each of the clients having a client asset balance in a respective client account associated with the at least one financial entity, comprising: a database maintaining records of assets in the group of aggregated accounts; and one or more processors operably connected to the database for implementing the following components: (1) a deposit institution allocation system that allocates fund deposits to and fund withdrawals from the aggregated accounts, comprising: (a) a net transaction activity monitor that calculates an aggregated transaction amount based on a total net transaction of the plurality of the client accounts during a period of time; (b) a selection component for selecting at least one aggregated account in the group from among the group of aggregated accounts in the different deposit institutions to which to deposit or to withdraw funds based, at least in part, so as to avoid withdrawing funds from or depositing funds to at least a different one of the aggregated accounts in the group; and (2) a withdrawal component for withdrawing funds from or depositing funds to the at least one of the aggregated accounts based on the allocation.

In a further embodiment, the withdrawal component comprises a message generator that generates one or more messages for facilitating withdrawal of funds from or deposit of funds to one or more of the aggregated accounts their respective associated deposit institutions.

In a further embodiment, a program product is provided for managing a group of aggregated accounts, each aggregated account held in a different one of a plurality of deposit institutions, each of the aggregated accounts associated with at least one financial entity and holding funds of a plurality of clients of the at least one financial entity, each of the clients having a client asset balance in a respective client account associated with the at least one financial entity, comprising: one or more computer usable media having computer readable program code embodied therein or among them, to be executed by a computer, the computer readable program code comprising: (1) program code for allocating fund deposits to and fund withdrawals from the aggregated accounts, the step of allocating comprising: (a) calculating an aggregated transaction amount based on a total net transaction from among the plurality of the client accounts during a period of time; (b) selecting at least one aggregated account from among the group of aggregated accounts in the different deposit institutions to which to deposit or to withdraw funds based, at least in part, so as to avoid withdrawing funds from or depositing funds to at least a different one of the aggregated accounts in the group; and (2) program code for withdrawing funds from or depositing funds to the at least one of the aggregated accounts based on the allocation.

These and other features of this invention are described in, or are apparent from, the following detailed description of various exemplary embodiments of this invention

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
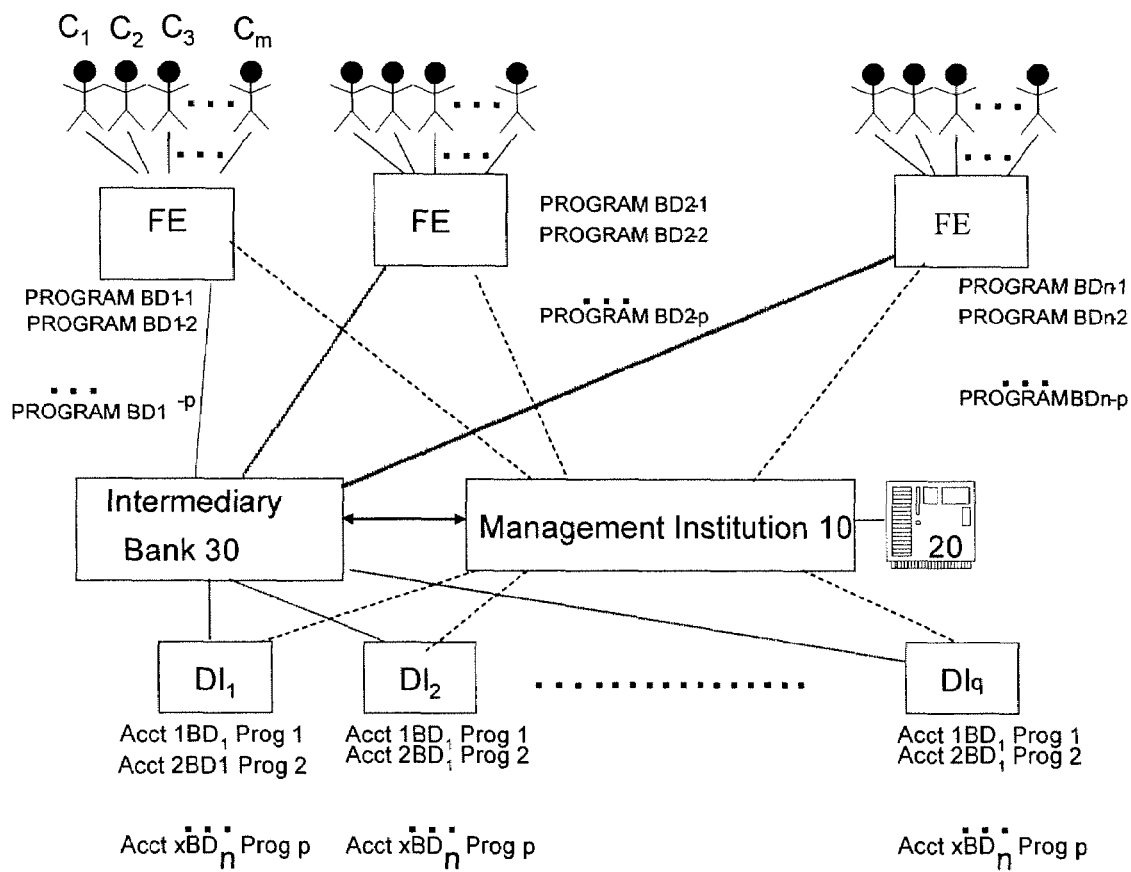
FIG. 1 is a block diagram of a system for managing aggregated accounts according to an exemplary embodiment of the present invention.

The following terms are used with the indicated meanings:

"account" comprises transaction accounts in which funds can be deposited, including without limitation, demand deposit accounts (DDA's), money market deposit accounts (MMDA's), NOW accounts, all forms of corporate accounts, and any other type of accounts that can be held by an entity.

"aggregated account" comprises an account at a deposit institution for holding funds for a plurality of clients from one or more financial entities. The aggregated account can be a segregated account that only holds the funds for a plurality of clients of a single financial entity that may be self-clearing. Alternatively, the aggregated account can hold the assets for a plurality of clients of a plurality of financial entities which may utilize the clearing services provided by a self-clearing financial entity or a management institution, depending upon the program.

"financial entity" is intended to be interpreted broadly to cover a variety of entities offering programs such as brokerage advisors, investment advisors, broker dealers, savings institutions, credit unions, banks, management institutions and the like. A financial entity may maintain one or more client accounts on behalf of one or more clients for receiving funds deposited thereto, and for debiting checks or other financial instruments drawn against that account.

"customer entity" or "customer" collectively refer to those financial entities whose clients have an ownership interest directly or indirectly in the funds in one or more aggregated accounts.

"client of a customer entity" or "clien" collectively refer to the ownership interests that have deposited funds at the financial entities, for example, in the form of individual accounts, joint accounts, trust accounts, ERISA accounts, non-US accounts, and any of a variety of other programs. Example client types include individuals, profit or non-profit corporations, limited liability corporations, partnerships or other forms of business entities, government agencies, and municipalities. There is no limitation on the types of accounts that can participate in the Program.

The present invention relates, in one embodiment, to a system and method for managing deposits and withdrawals from among a plurality of aggregated accounts held at a plurality of deposit institutions in order to obtain FDIC insurance above the limit set for individual accounts. In a further embodiment, the invention relates to a system and method for managing the transfer of client funds received from one or more financial entities by controlling the deposits to and withdrawals from among a plurality of aggregated accounts held at a plurality of deposit institutions in order to obtain certain results. In one embodiment, the deposits and withdrawals are managed to strive to obtain balances in one or more aggregated accounts in one or more destination deposit institutions associated with a financial entity(s) or program that are above the respective minimum caps for the respective deposit accounts at the different respective deposit institutions. In a further embodiment, the deposits and withdrawals are managed to strive to obtain balances in one or more aggregated accounts held in one or more destination deposit institutions associated with a financial entity(s) or program that fall between respective min and max caps for each respective aggregated account at the respective deposit institutions. In yet a further embodiment, the deposits and withdrawals are managed to strive to obtain balances in a plurality of aggregated accounts associated with different programs but in the same deposit institution, but managed by the same management institution, above a minimum cap associated with the deposit institution. In a further embodiment, the deposits and withdrawals are managed to strive to obtain balances, that once reached in one or more aggregated account, are held stable with limited or no account activity.

In yet a further embodiment, the deposits and withdrawals from the deposit accounts are managed to ensure that no more than a predetermined amount, such as for example, $100,000, associated with a given client is held in any one deposit institution. In a yet further embodiment, the transfers of funds from customer financial entities through a control operating account for one or more aggregated accounts uses an allocation of client funds among clients of the financial entity to ensure that all client balances residing in the control operating account become insured within a short period after receipt into the control operating account, even if over the FDIC insurance limit for one or more clients. In a further embodiment, the deposits to and withdrawals from the aggregated accounts are managed to obtain a hold back amount to be used to cover late transactions after the closing time. In yet a further embodiment, a pre-paid interest is accumulated and used to fund interest payments for client accounts being closed in mid-period, before the monthly or quarterly distribution of interest by the one or more aggregated accounts in deposit institutions holding the client's funds. In yet a further embodiment, a reconciliation process ensures that client balances reflected in the records maintained by financial entities for their participating clients are equal to the client balances reflected in a management institution's records for those same participating clients, and that aggregate balances maintained in aggregated accounts at respective deposit institutions are in balance with an aggregate balance of the individual client balances reflected in the management institution records and the financial entity records. On a daily basis or other periodic basis, this reconciliation process in one embodiment includes comparing the aggregate balances for clients maintained by the management institution to the position maintained at the financial entity for each of its clients, comparing the aggregate balance at each deposit institution maintained by the management institution to the actual aggregate balance at each deposit institution, and in addition a control operating account in an intermediate bank used for facilitating fund transfers is reconciled to ensure the correct money movements as specified by the various deposit institution allocations has taken place. In yet a further embodiment, the minimum and/or maximum caps are varied to manage the amount of net assets in an affiliated deposit institution.

FIG. 1 is a block diagram of a system for allocating deposits to and withdrawals from aggregated accounts, generally designated by reference number 1, according to an exemplary embodiment of the present invention. The system 1 includes a number of financial entities FE1-FEn, each managing one or more programs, such as insured deposit products, for example. Each program may include one or more insured deposit products, each having different attributes, such as insurance level, different tier options and rates paid and services. In one embodiment, the rates paid may be determined by such factors as the balance in the client's insured account, or can be determined by the total value of the client's brokerage account, or determined by the total value of a group of accounts for a particular household together, or determined by relationship pricing based on the number of products a client uses though a financial entity or sister entities, to name a few. Each financial entity FE1-FEn may have a plurality of clients C1-Cm that invest in particular products that make up part of a particular program. The clients C1-Cm may be individuals or corporations or any other form of entity. Thus, for example, a financial entity FE1 may manage a number of programs designated in FIG. 1 as PROGRAM FE1-1, PROGRAM FE1-2, . . . PROGRAM FE1-$p$, where each client C1-Cm of the financial entity FE1 invests in at least one of the products under at least one of the programs PROGRAM FE1-1-PROGRAM FE1-$p$. Examples of different kinds of programs that may be offered, include a program with cash management services, a program for high net worth individuals with a higher minimum balance required, a program paying a lower rate and offering more services, a no frills program with a higher rate and no services, however for a fee the client could get other services, to name a few.

The system 1 also includes a number of deposit institutions DI1-DIq, into which funds are deposited. Deposit institutions DI1-DIq may be, for example, banks or credit unions, or other types of deposit institutions. Preferably, at least some of deposit institutions DI1-DIq are FDIC insured. However, not all deposit institutions need be FDIC insured. For example, certain PROGRAMS can also default to a money fund, or other uninsured deposit account, if the client's account balance is over the FDIC insurance limit for that PROGRAM. Preferably, at least some of deposit institutions DI1-DIq are FDIC insured. While the basic federal insurance amount is currently $100,000, more than $100,000 of coverage can be obtained if funds are maintained in different ownership categories, according to the FDIC. For example, coverage of up to $100,000 can be obtained for individual accounts at a deposit institution, another $100,000 for each share of joint accounts at the same deposit institution, and yet another $250,000 for retirement accounts held at the same deposit institution. Moreover, by depositing funds at more than one FDIC insured deposit institution, multiples of $100,000 of coverage can become protected by federal insurance. For example, if deposits are made to 10 FDIC insured deposit institutions, with no more than $100,000 for each ownership category deposited in each of said 10 FDIC deposit institutions, then $1 million of effective federal insurance can be obtained for each ownership category.

In one embodiment, a financial entity, or a management institution 10, acting as agent for the financial entity (to be discussed later) manages in each deposit institution (e.g., bank or saving institution) an aggregate money market deposit account (MMDA) and an aggregate demand deposit account (DDA), both being in the identical name of the financial entity, or its agent (referred to herein as an "MMDA-DDA pair"). In response to client deposit and withdrawal transactions, the financial entity or its agent initiates transfers of funds between the MMDA-DDA pairs, so that if the aggregate deposits of all clients for that financial institution or PROGRAM exceed the aggregate client withdrawals (net client credit), then all or some of the funds may be deposited directly in the MMDA at the deposit institution or, in an alternative embodiment, by way of the DDA in the MMDA-DDA pair. Conversely, if client withdrawals for all clients of that financial institution or Program exceed client deposits (net client debit), then the deposit institution may be instructed by messenger or otherwise to transfer funds from the aggregate MMDA to the DDA.

As noted, the MMDAs are interest-bearing, insured deposit accounts, collectively in which the managed balances for clients are deposited. The DDAs, which are deposit accounts permitting an unlimited number of deposits and withdrawals, serve to facilitate the exchange of funds between the MMDAs, the deposit institutions, and sources of client transactions (referred to herein as "transaction sources"). If the financial entity or the management institution 10 determines that it is necessary to move funds from a particular MMDA (at a particular deposit institution), it first causes a messenger or otherwise to have these funds transferred from the MMDA to the DDA member of the MMDA-DDA pair, and second causes the funds in the DDA to be moved to the financial entity's or its agent's own account or accounts. Then, from these accounts, funds may be further transferred to a third party, such as a transaction source or a customer financial entity (preferably by electronic or other automatic means). If funds are to be moved into a particular MMDA, the agent either may have them deposited into the associated DDA and then moved into the MMDA, or may have them deposited directly into the MMDA. The agent database is updated to reflect these funds transfers.

While in a preferred embodiment, a separate account or set of accounts, e.g., money market deposit accounts (MMDA), demand deposit accounts (DDA), are set up for each program for each financial entity, and under certain embodiments of the present invention different programs of the same financial entity or different financial entities can be commingled and aggregated. Note that a financial entity does not have to set up a separate money market deposit account (MMDA) and associated demand deposit account (DDA) for each PROGRAM at the deposit institution, i.e., the same MMDA and/or DDA can be used across several PROGRAMS if registered, e.g., in the name of and offered by the same self clearing financial entity. Similarly, a single MMDA or other type of account can be set up at each deposit institution, or more than two accounts can be set up at each deposit institution. If a financial entity is a clearing firm that provides clearing services for other financial entities (correspondents), it is not necessary for the correspondents to set up a segregated MMDA and DDA for their respective Programs. Note that it is not necessary for each financial entity, whether a bank or other entity, to setup segregated aggregated accounts at the deposit institution. Rather a management institution 10 could act as an agent for a group of such financial entities so that assets for several financial entity banks or other entities can be held in the same MMDA and DDA registered in the name of the management institution at each deposit institution DI1-DIq. But if the same PROGRAM is being offered by different financial entities, separate accounts are used for each financial entity that is a self clearing financial entity. Note that a self clearing financial entity is defined as a financial entity that provides clearing services for his clients only and/or provides clearing services for other financial entities that are not self clearing but correspondents of the self clearing financial entity. The deposits for the clients of the correspondent financial entities would be held in the self clearing financial entity's MMDA that is held in a deposit institution associated with that self clearing financial entity. Thus, for example, if deposit institution DI1 participates in three Programs each run by a different self clearing financial entity, the deposit institution DI1 may have three segregated aggregated accounts, each aggregated account associated with a different self clearing financial entity. The segregated aggregated accounts are preferably money market deposit accounts (MMDAs) registered in the name of the financial entity that manages the program associated with the MMDA. However, any other suitable investment accounts may be used, such as NOW accounts for individuals, or DDA's. Moreover, more than one type of account could be used, e.g., an aggregated MMDA and an aggregated DDA at each deposit institution. In some embodiments as noted above, a management institution 10 may be provided within the system 1 that could maintain account information for each of the financial entities (FE1, FE2, . . . FEn) and others in a database within its own system or have such a database maintained for its use.

In embodiments comprising a management institution, the management institution 10 is configured to allocate and manage deposits, withdrawals and other transactions relating to each of the accounts in each of the deposit institutions DI1-DIq. Thus, the management institution tracks the net activity for the aggregated accounts maintained by the financial entity or the management institution 10 itself at the deposit institutions DI1-DIq based on information sent from the financial entities FE1-FEn to the management institution 10 and/or from other appropriate sources via contract or otherwise. The management institution 10 maintains records or has maintained for it records on each financial entity and their respective clients with funds in deposit institutions managed by the management institution 10, whether the financial entity is self clearing or not. Thus, in one embodiment, the management institution 10 maintains accounts records for all of the client accounts of the financial entities with funds managed by the management institution 10. As explained more fully below, the management institution 10 may automatically generate reports, for example in the form of e-mail messages, text messages, faxes, etc., advising the financial entities FE1-FEn of the day's net activity for a specific account in a specific deposit institution DIq holding funds for that financial entity, and/or activity in one or more client accounts of that financial entity. If more than one account is maintained at a deposit institution DI1-DIq, each account may be settled separately. The management institution 10 maintains or has maintained for it computer software and/or hardware 20 located at the management institution site, or at a remote site that is in communication with the management institution 10, that maintains databases and other program functions to track the activities in the various aggregated accounts in each deposit institution DI1-DIq. Examples of such computer software and/or hardware will be discussed below.

An intermediary bank 30 may be incorporated as part of the system 1 to oversee and facilitate the transactions to and from the various aggregated accounts based on management institution 10 allocations. The intermediary bank 30 may either be the same as or separate from the management institution 10. In embodiments where the management institution 10 and the intermediary bank 30 are separate entities, they may be in substantially constant electronic communication. The intermediary bank 30 includes one or more control operating accounts, for example, one control operating account per self clearing financial entity. In one embodiment, the management institution 10 also maintains records of deposits, debits and balances for each client of a financial entity with funds in a control operating account, whether or not that financial entity is a self clearing financial entity. At the end of a period of time, such as 2-4 hours, or a day, for example, the balance of funds in each of the control operating accounts at the intermediary bank 30 are transferred to or from one or more of the deposit institutions DI1-DIq. Note that in some embodiments where the self clearing FI's are not banks, self clearing financial entities use the intermediary bank to execute the wires, i.e., to send and receive wires/funds from the deposit institutions.

According to various exemplary embodiments of the method of the present invention, each deposit institution DI1-DIq may be assigned a minimum deposit cap (Min Cap), a maximum deposit cap (Max Cap), and an absolute cap (Absolute Cap). These caps are used to determine which deposit institutions to select in an allocation process for a sweep file net deposit or withdrawal, to be discussed below. These caps may remain the same or be reset as appropriate.

"Min Cap" is the minimum deposit amount to be maintained either in a given aggregated account at a destination deposit institution, or the minimum deposit amount to be maintained over a plurality of aggregated accounts at a destination deposit institution. In one embodiment, the minimum cap may be negotiated for an individual aggregate account at a deposit institution. If there is only one aggregate account at the deposit institution, then this minimum pertains/is associated with the overall deposit institution. In another embodiment, a management institution may manage a plurality of different programs for its customer financial entities, with each different program having a plurality of destination deposit institutions for depositing funds thereamong for that program or financial entity, wherein there may be an overlap in the destination deposit institutions of the programs. The management institution may then negotiate a minimum cap for the deposit institution and split the minimum in its discretion between or among different aggregated accounts associated with the different programs at the same deposit institution, and may alter that split on a real time basis in its discretion. The minimum deposit cap can be set to zero or greater. Accordingly, when allocating deposits to the deposit institutions for a given financial entity and/or program, the allocation process will attempt to satisfy the minimum deposit cap associated with the aggregated account for that financial entity and/or program at the destination deposit institution. In an embodiment, the allocation process may allocate withdrawal of funds first from aggregated accounts held in destination deposit institutions for that financial entity and/or program that have balances above their respective minimum deposit caps before it allocates withdrawal of funds from aggregated accounts held in destination deposit institutions for that financial entity and/or program that are at or below their respective minimum deposit caps. Note that the Min Cap can be set using a variety of factors. As noted, the Min Cap at a deposit institution may be associated with a single aggregated account of a financial entity and/or program. Thus, there may be a different respective Min Cap associated with each different financial entity with an aggregated account registered at that deposit institution. In an alternative embodiment, as noted above the Min Cap may be negotiated with a management institution 10 and may cover the aggregate of all of the funds managed by that management institution in aggregated accounts in that deposit institution. Thus, the management institution would attempt to ensure that a certain stable minimum amount of total assets managed by the management institution were maintained at that deposit institution "Max Cap" is the maximum deposit amount that is to be maintained either in a given aggregated account at a destination deposit institution, or the maximum deposit amount to be maintained over a plurality of aggregated accounts, each associated with a different financial entity and/or program, at a destination deposit institution. The system will allocate deposits to respective aggregated accounts held in destination deposit institutions associated with the given financial entity and/or program that are below their respective Max Caps in an order that is set by rule for deposits. As with the Min Cap, the Max Cap may be one associated with a single aggregated account of a single financial entity. Alternatively, the Max Cap may be the aggregate dollar amount the management institution 10 has approved for the particular deposit institution to be split among a plurality of the aggregated accounts at that deposit institution, or a lesser amount set by that deposit institution for all of the accounts managed by the management institution 10. In one embodiment, the Max Cap is set based on a credit policy. In this embodiment, before a deposit institution is added to the deposit system of the present invention, the management institution 10 performs a credit check and determines if the deposit institution meets predetermined credit standards required by the financial entity associated with that aggregated account, or alternatively required by a management institution credit policy. The management institution 10 then approves each deposit institution for a specific aggregate deposit amount that is either associated with a given aggregated account at the deposit institution, or with the overall deposit institution. This amount may be changed over time as circumstances require. The Max Cap thus functions in this embodiment as a safety cap to ensure that the system does not allocate a deposit to an aggregated account at the deposit institution that will push it over the Max Cap. As noted above, at times the deposit institution will request a lower deposit max cap.

"Absolute Cap" is the maximum deposit amount approved for either the aggregated account held in a destination deposit institution or for the deposit institution itself. The absolute cap can be greater than or equal to the Max Cap. In situations where some or all of the aggregated accounts are at or over their respective Max Caps, the system may allocate deposits to aggregated accounts or to deposit institutions above their respective Max Caps up to an Absolute Cap that should not be exceeded.

"Min=Max" if the min and max cap are equal, the aggregated account held in the destination deposit institution is preferably bypassed by the allocation process once deposits from a given financial entity and/or program reach the level of the Min=Max Cap. It is intended that such aggregated account held in the deposit institution, after its balance of assets is at or above it Min Cap, shall have virtually no activity, other than the posting of interest at month end. The allocation process is designed to access the funds in these deposit institutions only if there is no other option. The allocation process automatically allows for minimal increases in the Max Caps at month end to allow for interest posting.

The management institution 10 is designed to run two allocation processes: a deposit institution allocation process, which allocates funds between/among the deposit institutions DI1-DIq, and a client account balance allocation (to be discussed later). Referring to the deposit institution allocation process, as explained in further detail below, this allocation process may serve one or more of several purposes, such as, for example, to maintain substantially stable deposit funds at a deposit institution by a financial entity or a management institution by limiting deposit/withdrawal activity, to ensure that activity at the deposit institutions DI1-DIq complies with federal regulations such as FDIC regulations, to ensure compliance with a credit policy, and to insure compliance with specific rules set by the client, the Financial entity, or the branch.

With reference to the Min=Max cap parameter, the inventors have recognized that deposit institutions are more willing to accept large deposits if the management institution can guarantee substantial stability, with limited activity. If the account has substantial activity it becomes a burden to the deposit institution. Minimization of deposit and withdrawal activity also makes reconciliation easier for the given financial entity maintaining funds in that deposit institution, since it is less costly if the financial entity and/or the management institution 10 is not sending wires every day to every deposit institution. Additionally, deposit/withdrawal minimization reduces the people resources needed to administer the various program.

In one embodiment, the deposit institution allocation process through the use of the Min Cap, may try to bring the balance in each aggregated account at the deposit institutions up to at least a minimum deposit cap. This minimum deposit cap may be negotiated based on a variety of business and banking concerns such as a minimum level of stable assets maintained by a financial entity or program or the management institution at the depository institution, or the deposit institutions overall need for deposits to cover loan activity, and minimization of deposit/withdrawal activity, as discussed above.

As noted above, a maximum deposit cap, Max Cap, may also be set for the particular deposit institution for various reasons including maintaining a credit policy, and controlling a level of activity in a transaction account.

The deposit institution allocation process may be set to minimize activity for that aggregated account after the balance in the account has reached the Min Cap, via by-passing withdrawals or credits to that deposit institution account by setting the minimum deposit cap equal to the maximum deposit cap. Alternatively, other methods of flagging accounts that should remain unchanged as a result of net daily activity can be used as the equivalent of setting the maximum deposit and the minimum deposit to be equal. For example, a flagging method may comprise determining if a flag such as a data field has been set in the system or a database indicates whether to avoid withdrawing funds from or depositing funds to the different one of the aggregated accounts, or if a rule is currently in operation to avoid withdrawing funds from or depositing funds to the different one of the aggregated accounts. In one embodiment, this data field or rule may be associated with a given day, set of days, week, etc., and may indicate that no withdrawals are to take place for the designated periods. Alternatively, such a flag or rule may indicate that no deposit or withdrawal activity is to take place with respect to the particular aggregated account. Note that in one embodiment, deposit and/or withdrawal activity may be directed to or away from a given aggregated account using minimum caps, maximum caps, flags, rules, and various combinations thereof.

In some instances, the allocation process may not be able to by-pass a particular deposit institution for withdrawals, such as when a by-pass is in conflict with set parameters or a client has a withdrawal that is only attached to the particular deposit institution. In this case, the deposit institution allocation process will allow the withdrawal but attempt to replace the dollar amount withdrawn with an offsetting credit from one or more other clients of that financial entity with funds in an aggregated account at a different deposit institution associated with that financial entity, and/or in some instances simply with funds from another deposit institution managed by the management institution 10. Accordingly, the process reallocates funds from one or more aggregated accounts attached to other deposit institutions. Thus, the net activity for the deposit institution in which the withdrawal should have been by-passed is at or about zero. The manner in which the deposit institution allocation process is used to offset withdrawals from aggregated accounts in which the minimum deposit cap is equal to the maximum deposit cap is demonstrated below with reference to Example 1:

EXAMPLE 1

Aggregated account 1 associated with a given financial entity FE1 has a withdrawal of $50,000 from one client deposit account that is attached only to an aggregated account held in deposit institution DI2. The minimum and maximum deposit caps associated with this aggregated account of deposit institution DI1 are set to be equal and the balance in the aggregated account for deposit institution DI1 is at its Min=Max Cap. The minimum and maximum deposit caps of various other aggregated accounts held in other destination deposit institutions DI2, DI3, etc. associated with the given financial entity and/or program are not set to be equal. The deposit institution allocation process looks at the net activity for a received sweep file containing information on deposits and withdrawals from client accounts associated with the financial entity FE1 or its correspondents, and then determines which destination deposit institution or institutions associated with that financial entity FE1 to credit or debit depending upon the Min Caps, Max Caps, and other business rules established on the system for the client accounts, the aggregated accounts, the financial entities and the branches. For the above example, the $50,000 withdrawal is attached to one client account and is designated for only the aggregated account for that financial entity and/or program held in deposit institution DI1 and must be offset with a $50,000 credit comprising funds from one or more aggregated accounts at one or more other destination deposit institutions associated with the given financial entity and/or program that do not have their Min Cap set equal to their Max Cap.

The second allocation process is the client account balance allocation. In this allocation, the client account balances are reshuffled/reallocated at some convenient time, to match the allocation to each deposit institution determined above. Thus, individual client balances for clients of a given financial entity FE1 or its correspondents can be shuffled/allocated to aggregated accounts in different deposit institutions. In one embodiment, the management institution 10 reshuffles by following individual client account business rules, and financial entity and correspondent and branch business rules (examples will provided below), and then the remaining client accounts are reshuffled/allocated beginning with the client account of the financial entity or correspondent (in the case of co-mingled accounts) with the highest balance and progressing to the client account with the lowest balance. The reallocation alternatively can be performed from the lowest account balance to the highest account balance, or in any other convenient sequence. In the example, the deposit institution DI1 with its aggregated account having its Min Cap=and Max Cap would not be debited for the $50,000 client withdrawal. Rather, the client account balances would be reshuffled among deposit institutions to allocate sufficient balances from other deposit institutions associated with financial entity FE1 either directly or through a correspondent relationship to ensure that the aggregate amount on deposit remains unchanged at the deposit institution DI1.

The transferring of funds from the financial entity to one or more deposit institutions may be performed, in one embodiment, by way of an intermediary bank 30 which may or may not be associated with the management institution 10. This movement/distribution of the funds may be accomplished before or after the reshuffling of client account balances process. In one embodiment, a deposit of the funds to the deposit institutions may be accomplished by sending, by any convenient mode of communication, e.g., wire, email, telephone, mail, etc., an order to the intermediary bank 30 to transfer funds to selected destination deposit institutions DI associated with the financial entity and/or program in the amounts prescribed. For debits, in one embodiment, a wire or other convenient mode of communication may be sent by the management institution 10 or a self clearing financial entity depending on whether or not the accounts are segregated, to a messenger service to have a messenger deliver a transfer form sent to the deposit institution to cause it to withdraw funds. In this manner, a debit of funds is made from selected deposit institutions associated with financial entity in amounts prescribed. Other known or future developed techniques for delivering funds may also be used.

In an embodiment of the invention, the allocation process may also be used to ensure that the deposit institutions DI1-DIq comply with FDIC regulations. For example, federal regulations currently prohibit more than six withdrawals from interest bearing demand accounts during a monthly period using certain withdrawal techniques. In this regard, the deposit institution allocation and/or the client balance allocation process may function to redistribute funds such that no more than a maximum number of withdrawals (e.g., five) are made from a single aggregated account at a deposit institution during a monthly period or some other required period. This may be accomplished by balancing deposits and withdrawals so that there is net debit activity at only one deposit institution on any given day, or in some embodiments only a small number, of the deposit institutions DI1-DIq on a given day, and the deposit institution which has the net debit activity is varied during a reporting period so that the same deposit institution is not used more than a maximum number of times in a given month. The maximum number of times that a particular deposit institution may be used during a monthly period may be set at any number, such as, for example, four or five times per month, up to, for example, six, based on market regulations. Thus, if the maximum number is set at five, for example, at least four deposit institutions can be used in a given month to make withdrawals (e.g., either the same deposit institution has withdrawals/debits each day during a given week, the same deposit institution receives debits only on a given day of the week, or at random).

Figure 2A:
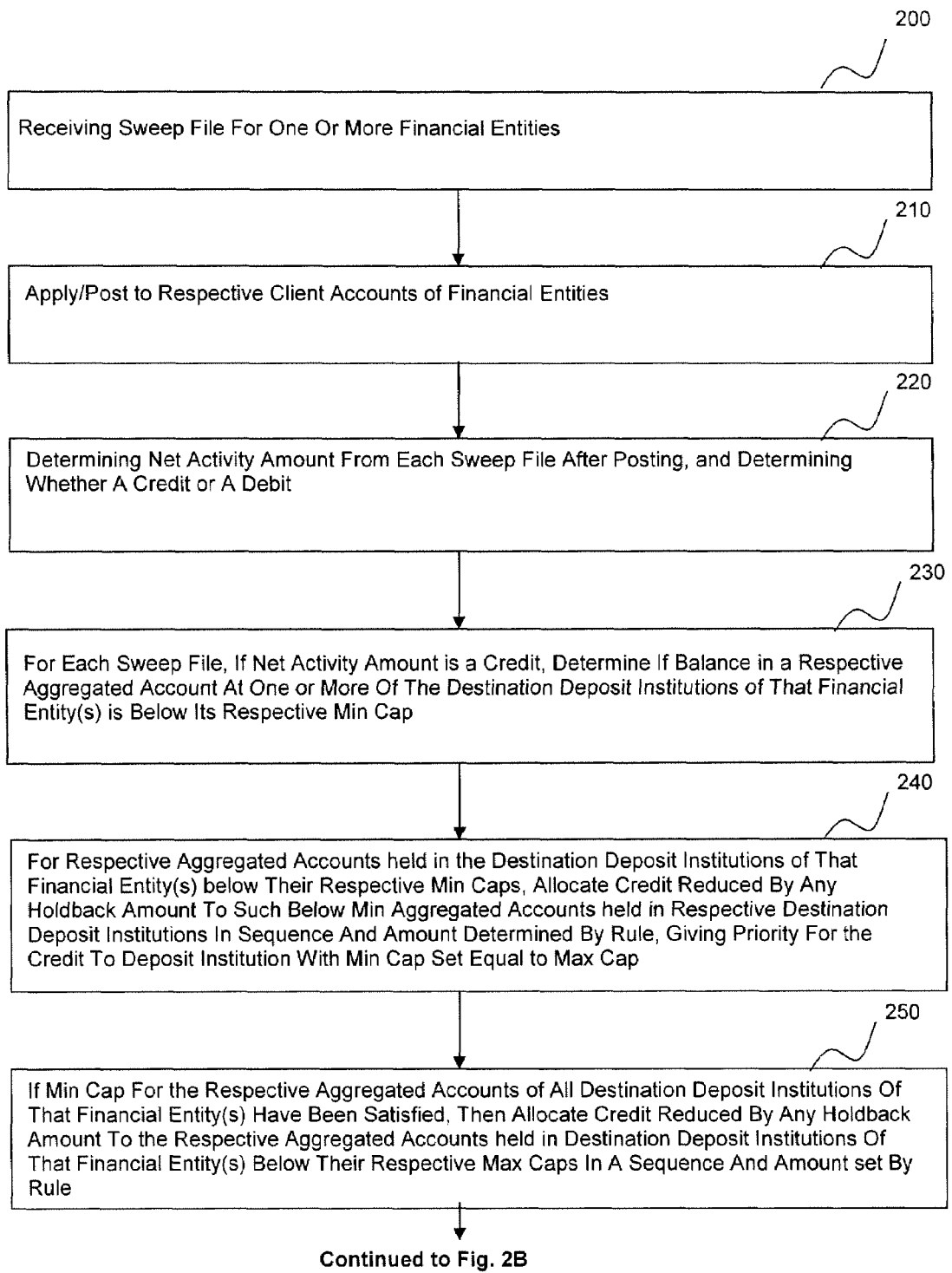
FIGS. 2A and 2B are flowcharts for one embodiment of an allocation process in accordance with the present invention.
Figure 2B:
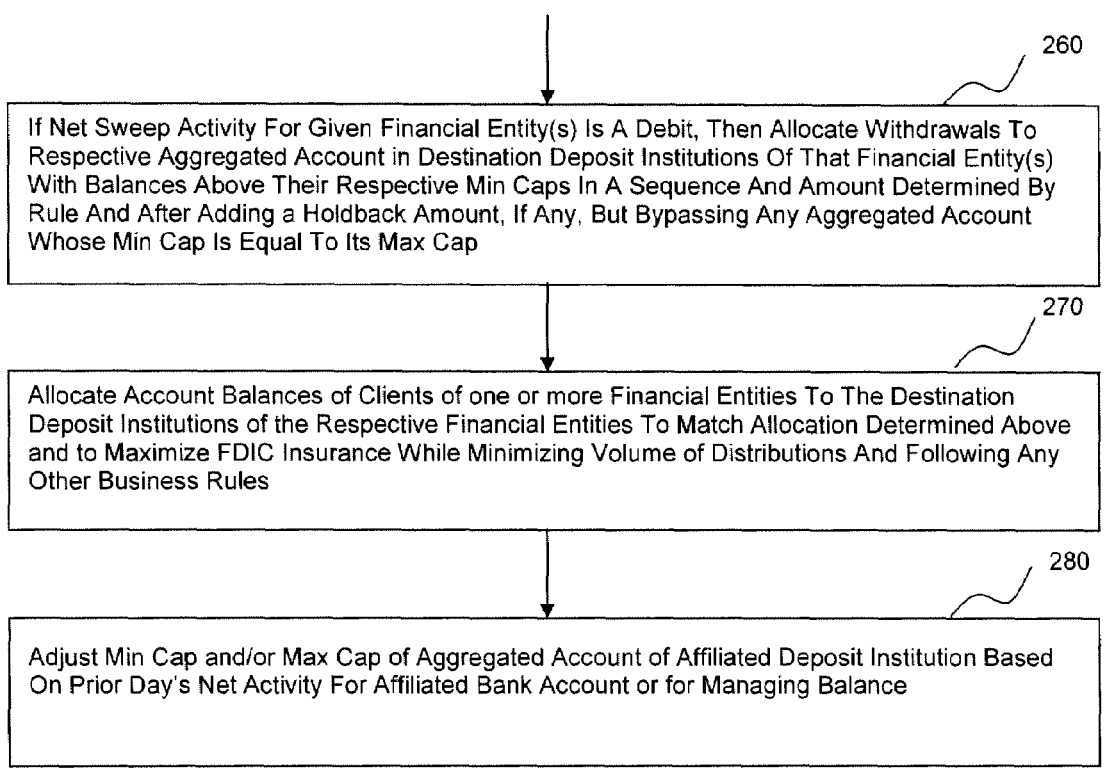

Referring now to FIG. 2, an example embodiment of the allocation process is provided. The deposit institution allocation process may be run after a sweep file containing transaction activity has been received and processed. The timing and content of the received sweep file is determined as a matter of administrative convenience based on how the clients transactions are processed by their respective financial entity. Accordingly, in a first step 200, a sweep file for a given financial entity, is received by the system. In one embodiment, the sweep file may comprise data for deposit and withdrawal transactions for one or more Programs in which that financial entity is participating. Multiple sweep files may be used at the same or different times of the day. Similarly, in another embodiment, a given sweep file may be an aggregation of sweep files from a given financial entity and various correspondent entities. For example, a clearing financial entity would not send to the system a separate sweep file for each of its correspondent entities. Rather all activity for the self clearing financial entity is included on the sweep file, along with the transaction activity for all correspondents and/or programs.

Referring to step 210, the various transactions in the sweep file are posted/applied to respective client accounts of the financial entity or its correspondents. Account liquidation orders and overdrafts and other unusual transactions may be processed at this time. In one embodiment, agreement may be/or is required to be reached between the financial entity and the management institution 10 on each posting or on an aggregate of postings, and any discrepancies investigated.

Referring to step 220, the net activity for the sweep file for that financial entity is then determined and an indication is made whether the net activity is a credit or a debit.

Referring to step 230, if the net activity is a credit, then the process determines if a balance at one or more destination deposit institutions associated with this program of that financial entity is below its minimum cap, Min Cap.

Referring to step 240, the process will then allocate (the deposit institution allocation) a credit, reduced in one embodiment by any holdback amount (to be discussed below), to a respective one or more aggregated accounts in one or more destination deposit institutions associated with that financial entity, or in some embodiments, with a particular program associated with that Financial entity, provided that the aggregated accounts are below their respective minimum caps (Min Caps). If there is more than one aggregated account associated with that financial entity below its respective minimum cap, the process will allocate according to one or more rules to the aggregated accounts in a sequence order and amounts set for deposits. For example, one rule might be to always allocate first to aggregated accounts associated with that financial entity/program whose Min Cap is set equal to its Max Cap and the balance for that aggregated account is under the Min Cap. Another rule might be to allocate credits to aggregated accounts in the different respective destination deposit institutions in an order beginning with the farthest aggregated account balance below its respective minimum cap up to the balance that is closest to the minimum cap. Another rule might be to deposit an amount only sufficient to bring the balance held in the aggregated account deposit institution up to its Min Cap, and then to allocate the remainder to an aggregated account in a different destination deposit institution associated with that financial entity, where the balance in that aggregated account is below its Min Cap, in an amount up to its Min Cap, etc. Thus, in one embodiment, the process may attempt to satisfy the Min Cap for the aggregated account in each different destination deposit institution in its deposit institution allocation process if sufficient funds are available in the credit. Another rule may be to make deposits up to the Min Cap in a particular order of aggregated accounts in the different deposit institutions.

Referring to step 250, if the Min Cap for the respective aggregated account in each different destination deposit institution associated with that financial entity has been satisfied, the process will then look for respective aggregated accounts in different destination deposit institutions associated with that financial entity and/or program that are below their respective Max Caps to which to allocate the credit, or remainder of the credit. In one embodiment, this credit may be reduced by a holdback amount (to be discussed below). If there is more than one aggregated account below its respective maximum deposit cap, Max Cap, then the system will allocate the credit reduced by any holdback to the other respective aggregated accounts in the other destination deposit institutions in a sequence and amount set by one or more rules for deposits. By way of example, one rule might be to allocate client account balances to respective aggregated accounts in the different destination deposit institutions with balances under the Max Cap by descending order of available aggregated account capacity, i.e., how far its balance is below the Max Cap, or how far the balance is above the Min Cap. A further rule regarding the amount to be deposited might comprise, after the balance in the aggregated account at the deposit institution reaches its maximum deposit cap, the management institution 10 moves on to a respective aggregated account held in the next destination deposit institution associated with that financial entity and/or program that is below its maximum deposit cap. A further rule may be to allocate deposits to a particular order of aggregated accounts/deposit institutions up to their Max Cap.

Note that in some situations some or all of the aggregated accounts associated with a given financial entity and/or program may be at or over their respective Max Caps. When a new deposit associated with client accounts of that financial entity or its correspondents is received, the system may allocate deposits to those aggregated accounts above their respective Max Caps for these deposit institutions up to an Absolute Cap that should not be exceeded. Alternatively, the excess deposits, with the client's consent, may also be deposited in a non-FDIC insured accounts, such as a money market mutual fund.

Referring to step 260, if the net sweep amount is a debit, then the process may first look for respective aggregated accounts in the different destination deposit institutions associated with that financial entity and/or program whose deposit balance is above the Min Cap to allocate the debit and, in one embodiment, adding a holdback amount thereto. The process will allocate withdrawal of funds based on a sequence and amount set by one or more rules for withdrawals. For example, one rule may be to bypass any aggregated account in a destination deposit institution that has its Min Cap set equal to its Max Cap and its balance is at or above its Min Cap, unless there is no other option. A rule relating to the order for withdrawal might comprise debiting in an order based on an amount that the balance in the aggregated account of the deposit institution exceeds the Min Cap for that aggregated account. Another rule relating to the amount to be withdrawn may be to set the amount to be withdrawn/debited from the given aggregated account in the destination deposit institution to be only sufficient to bring its aggregated account balance down to the minimum cap for that aggregated account for that deposit institution. A further rule might be to bypass withdrawals from an aggregated account that has already had a given number of withdrawals in that period, e.g., five. To the extent that none of the respective aggregated accounts in the respective destination deposit institutions have greater than their minimum cap in deposits, the management institution 10 may next follow a further prescribed order set for withdrawals from the deposit institutions.

Note that over the course of a period such as a day, there may be multiple runs of the deposit institution allocation process. In one embodiment, there may be a movement/transfer of funds to the one or more deposit institutions shortly after each deposit institution allocation process is run. Financial entity sweep files may be received throughout the day. If a sweep file is received from a financial entity that has a segregated program, then the allocation process is run on that sweep file. In one embodiment, as noted above, the allocation process might be run only after the management institution 10 and the financial entity agree upon a net settlement. One reason for obtaining an agreement upon a net settlement amount between the management institution 10 and the financial entity prior to running the allocation process is to ensure that the financial entity and the management institution 10 are in agreement on the activity to be posted. If there is a lack of agreement on such activity, then the activity must be investigated and discrepancies resolved before the bank allocation process is run. If a sweep file is received from a financial entity other than a financial entity with a segregated program, the management institution 10, in one embodiment, may run the deposit institution allocation process after all sweep files from all correspondent financial entities associated with that program are received and posted.

Some financial entities may also provide a second sweep file or a late transaction file for processing client transactions received late in the day after a cut-off time. The deposit institution allocation process is run again after this second sweep file has been posted utilizing funds held back in the earlier allocation. Accordingly, a given financial entity could provide a sweep file at 9 am, 11 am and 1 pm, and the management institution 10 could run the deposit institution allocation process after each sweep file is posted followed by a transfer of funds to the respective aggregated accounts in the one or more deposit institutions. But the holdback funds would not be used in any of these early allocations and distributions. The holdback amount would only be employed for the one or more deposit institution allocation processes run after the cut off time (typically 4:00 pm).

Referring to step 270, the process then reshuffles/reallocates the insured and uninsured account balances of the clients of the given financial entity (whether or not they had a credit or debit to their account) to fit precisely/match the deposit institution allocation to the respective aggregated accounts done earlier in the day or other time period that, in one embodiment, the reshuffling/client account balance reallocation is run only at the end of the day based on the last deposit institution allocation to be run for that financial entity or the management institution. This has the advantage of running the time-consuming client account balance reshuffle/reallocation across a large number of accounts distributed across a plurality of the aggregated accounts only once a day. Alternatively, the reshuffling/client account balance reallocation could be run after each deposit institution allocation process is run or it could be run at different times of the day. Regarding the uninsured account balances, there may be some Programs that insure a client only up to a maximum amount of insurance, e.g. $1 million (for example, using 10 banks). Thus, if more than this Program maximum is deposited, some amount will be uninsured for that client.

The allocation/reshuffling of client account balances may follow certain rules for insured deposits to maximize FDIC insurance. For example, the client account balances may be allocated/reshuffled into destination deposit institutions to meet FDIC insurance limit requirements (currently $100,000 for an individual account) while minimizing the volume of account balance redistributions required to match with the destination deposit institution allocation. Likewise, a rule may be followed that no more than six withdrawals may be made from a given deposit institution during a period such as a month.

The client account balance allocation/reshuffling step may be subject to various additional account specific rules and financial entity office/branch office level rules. In one embodiment, client account specific rules may be used first to direct the client account balance allocation. For example, if the client has opted out of a particular destination deposit institution, for example, because the client has funds in that deposit institution via an account with another financial entity, or the client has designated that the first $100,000 is to be deposited in a particular deposit institution, then such client account balance allocation will follow these rules in making the allocation of that client's balance. Then financial entity office/branch level allocation business rules may be followed in allocating the remaining balance of multiple accounts of the given financial entity in an order and amount specified by the applicable rule(s). In one embodiment, the client account balance allocation process thus first allocates non-zero balance accounts according to account or office/branch level Business Rules in descending aggregated account balance order. Finally, the client account balance allocation process will then allocate non-zero balance accounts not subject to any of the above applicable Business Rules in descending account balance order.

Thus, in one embodiment client account balances of the individual clients of the financial entity and correspondents of that financial entity are allocated/reshuffled to the respective aggregated accounts in the respective destination deposit institutions associated with that financial entity in the sequence order denoted above until all of the account assets are allocated. In a further embodiment, there may be a segregation by Program, so that client account balances associated with a given Program will be allocated to respective aggregated accounts associated with that Program in the respective destination deposit institutions in the sequence order denoted above until all of the account assets are allocated. The process will conclude when all account assets of the financial entity, or its correspondents in the case of a co-mingled account, are allocated across all deposit institutions associated with that financial entity.

Referring to step 280, processing for a financial entity that has an affiliated deposit institution is performed. In this regard, certain financial entities, such as banks, broker dealers, or financial advisors may have an affiliate relationship with a particular deposit institution. An insured deposit program of a financial entity frequently provides a valuable source of deposits for a given affiliated deposit institution which enables that deposit institution to support activities such as mortgage, loans, credit card activity, to name a few. The deposit institution then has a wealth of potential deposits that previously had gone to a money fund. To facilitate this access for a given affiliated deposit institution, this deposit institution may be given preference in the allocation by means of a minimum cap and one or more priority rules so that, for example, the first $100,000 of every account is deposited in the affiliated deposit institution as well any balances over the available insurance coverage for the account, e.g., any client deposit over $1 million. Another relationship or business rule to facilitate this affiliation may be that assets for a defined client account population of that financial entity are to be dedicated to/deposited to affiliated deposit institution for various reasons. Such account populations are usually defined by a branch/correspondent relationship and there is an associated business rule (e.g., an insured deposit instruction) set up for the branch or correspondent designating the affiliated deposit institution as the institution for the first deposit.

An advantage of using an affiliated deposit institution relationship set up via a minimum cap and one or more rules is that the affiliated program allows the affiliated deposit institution to manage its balance sheet to obtain structured growth. In this regard, even if an affiliated deposit institution is in a growth mode, for example, growing its loan portfolio, it may not be able to put to work/lend out more than a certain amount of money over a given period of time. It would be undesirable to take in a large amount of deposits on which interest is to be paid if the money cannot be lent out quickly. Thus, the minimum cap for the affiliated deposit institution can be increased as the needs of the loan portfolio increase. Thus, the minimum cap can be increased manually as capital requirements dictate. For example, if the affiliated deposit institution is purchasing a loan portfolio, the transfer of additional deposits to fund the loans can be scheduled. Alternatively, the minimum cap can be increased automatically, for example, based on a criterion. In one embodiment, the criterion might comprise a period of time. In another embodiment, the criterion might comprise reaching a new level of net assets in the aggregated account of the affiliated deposit institution. Another criterion might be that an amount of a capital usage level, such as a current or projected loan portfolio of retail loans or mortgages, has reached a predetermined level. Accordingly, when an affiliated deposit institution is in a start up mode, the affiliated deposit institution can manage its growth by controlling the deposits received from the broker dealers' clients. All this may be accomplished by setting the min cap and/or rules to schedule when additional deposits are to be directed to the aggregated account in the deposit institution.

Alternatively, if the affiliated deposit institution finds that it has more deposits than it can put to work, based on a current or projected capital usage level, then deposits can be withdrawn and placed with other destination deposit institutions associated with that financial entity. This withdrawal can be accomplished by setting and/or reducing a maximum cap coupled with one or more priority withdrawal rules for the aggregated account of the affiliated deposit institution. In one embodiment, a priority rule is set for the aggregated account of the affiliated deposit institution which requires that debits are first to be allocated to that aggregated account until the amount of net assets for the aggregated account drops to or below a respective maximum cap. Note that the maximum cap associated with the aggregated account of the affiliated deposit institution can be decreased manually to decrease the amount of net assets at the selected deposit institution based on a decreasing capital usage level, which may either be a current capital usage level or a projected capital usage level. In one embodiment, the maximum cap associated with the aggregated account can be decreased automatically, for example, based on a criterion. In one embodiment, the criterion is a time period. In another embodiment, the criterion is a dropping to a new level of net assets in the given one of the aggregated accounts. In a further embodiment, the criterion is that an amount of a capital usage level has dropped to a predetermined amount.

Note that the minimum cap and maximum cap operations and the rules to facilitate the affiliation relationship rule would have been one of the rules followed in running the deposit institution allocation process and the client account balance allocation process of FIG. 2, since the deposit institution allocation and the client account balance allocation processes respect all such branch/correspondent business rules.

In one embodiment, in order to build up/decrease assets at the particular affiliated deposit institution, a process may be run in step 280 in the morning of the subsequent business day or other period to determine the prior day's net activity for that affiliated deposit institution. The process step 280 would then adjust one or both of the Min and Max Caps for the deposit institution accordingly. In this manner deposits at the deposit institutions may be increased/decreased the next day by the prior day's net activity of a given client account population of a given financial entity and then maintained via the adjustment of the Min and Max Caps.

The process in one embodiment thus will derive, after posting, a net activity amount from daily financial entity sweep transactions and allocate the net amount to one or more destination deposit institutions based on deposit caps (Min Cap, Max Cap and Absolute Cap) and sequence order set by rule for the destination deposit institutions. The actual movement/distribution of funds to the deposit institutions takes place after this deposit institution allocation. Then the account balances of the clients of the financial entity are re-shuffled/allocated to meet this determined allocation. In one embodiment, the entire day's activity may be fit into one or a few deposit institutions based on consideration of the balances in the respective aggregated accounts in the different destination deposit institutions associated with the financial entity(s) or program with respect to the desired caps for the respective aggregated accounts and the various controlling rules.

Figure 3:
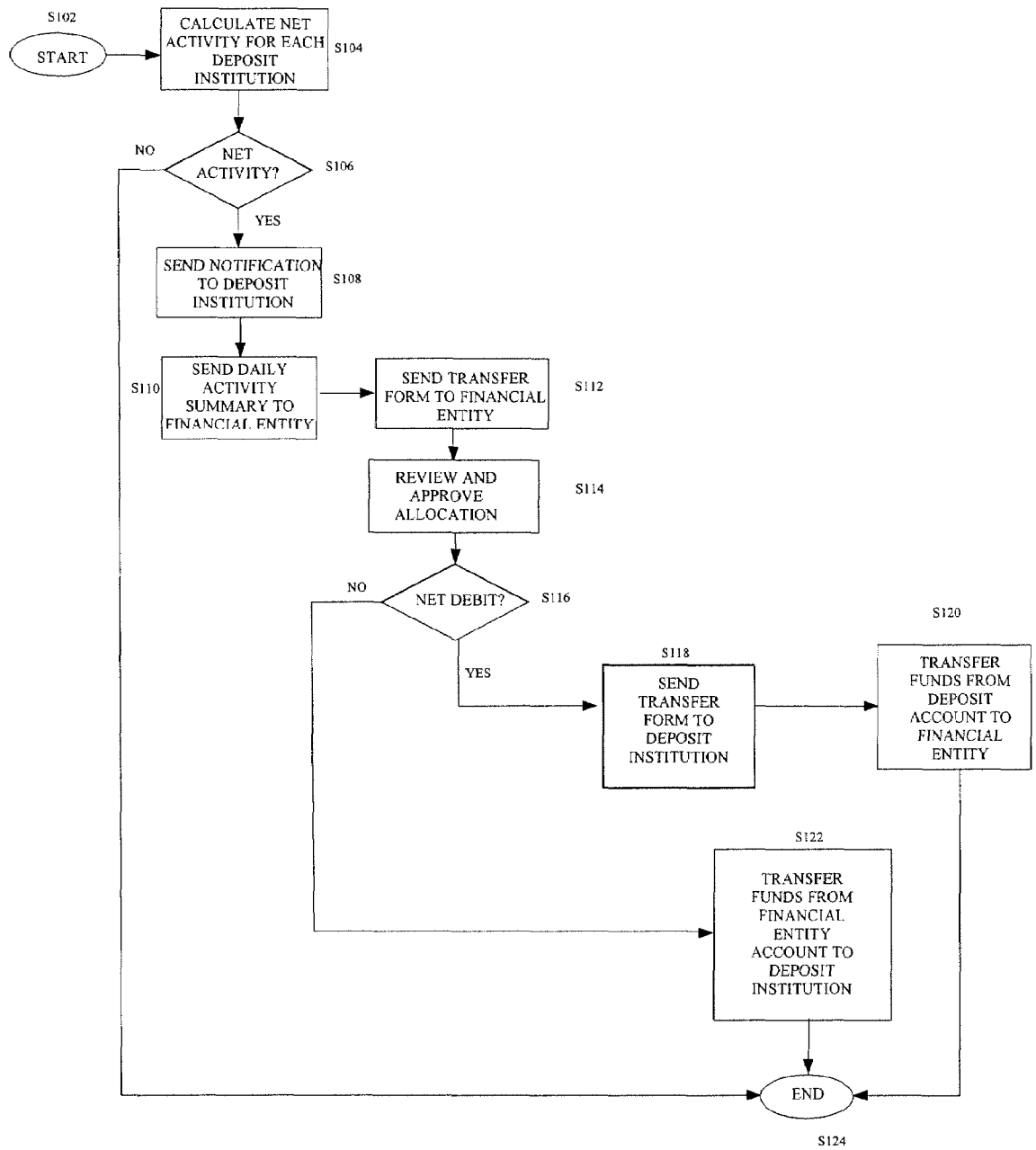
FIG. 3 is a flow chart illustrating a deposit institution final allocation process according to an exemplary embodiment of the present invention.

FIG. 3 is a flowchart describing the operational process of sending email to deposit institution and the financial entity moving the funds between deposit institutions. In step S102, the process is initiated, in one embodiment after each deposit institution allocation process has been run. In another embodiment, the step S102 could be initiated at the end of the day after all allocations from the financial entity have been completed. In step S104, the management institution 10 calculates, as described in the embodiment of FIG. 2 as one example, the net activity required at one or more aggregated accounts held in a respective one or more different destination deposit institutions in order to satisfy predefined program rules described previously. As noted previously, the net activity may be calculated to specifically take into account the minimum account balances, Min Caps, required to maintain asset stability in respective aggregated accounts at various different respective destination deposit institutions, the maximum account balances, Max Caps, set in order to maintain compliance with credit policy parameters, to limit the number of withdrawals, and based on various business rules.

Returning now to the deposit institution allocation process shown in FIG. 3, in step S106, the management institution 10 may determine per deposit institution whether any net activity has been calculated in step S104. The net activity may be net debit activity or net credit activity. If there should be net activity in a deposit institution, the process continues to step S108, where the management institution 10 may send notification of the necessary net activity to the deposit institution. Otherwise, if there is no net activity (i.e., the net activity is zero), the process will end at step S124. As noted, for some embodiments of the present invention the allocation process may minimize the number of aggregated accounts in the respective destination deposit institutions with net debit activity, in a manner such that no single aggregated account in a destination deposit institution has net debit activity during a monthly period more than a maximum number of times, e.g., 5 or 6 times. The notification to the deposit institutions that require net activity may be in the form of e-mail, facsimile, mail, messenger or through any other suitable form of communication.

In step S110, the management institution 10 may send a deposit institution allocation report to the financial entity. The deposit institution allocation report preferably includes information regarding the amount of the required net activity and the reason why the net activity is required to satisfy program rules. In step S112, the management institution 10 may send a transfer form to the financial entity that does business with a deposit institution that requires a net activity. The transfer form preferably indicates that a net debit transfer or a net credit transfer needs to be initiated in an aggregated account in a destination deposit institution that is to have a net activity. The deposit institution allocation reports and the transfer forms may be sent to the necessary financial entities via e-mail, facsimile, mail, messenger or through any other suitable form of communication.

In step S114, the financial entities that do business with a deposit institution that requires a net activity review may approve the transfer form sent to them. In this regard, the financial entities may review the deposit institution allocation reports to verify that the net sweep activity is equal to net activity within the deposit institutions. In step S116, the financial entity may determine whether the net activity is a net debit. If the net activity is a net debit, the process may continue to step S118, where the financial entity preferably completes a debit transfer form and sends the debit transfer form, via e-mail, facsimile, mail or through any other suitable form of communication, to the deposit institution that requires a net debit. In one embodiment, the financial entity or management institution may use a messenger to send the debit transfer form to the deposit institution. In other embodiments the financial entity or management institution may request the debit in person, by mail, by automated teller machine, and using the telephone and distributing by mail. The process then continues to step S120, where the necessary funds are transferred from the deposit institution to the financial entity account. The process then ends at step S124.

In step S116, if the financial entity determines that the net activity is not a net debit (i.e., the net activity is a net credit), the process may continue to step S122, where the financial entity transfers funds from the financial entity account to the deposit institution account. The transfer of funds may be completed by a wire transfer, or other suitable process. The process then ends at step S124.

Figure 4:
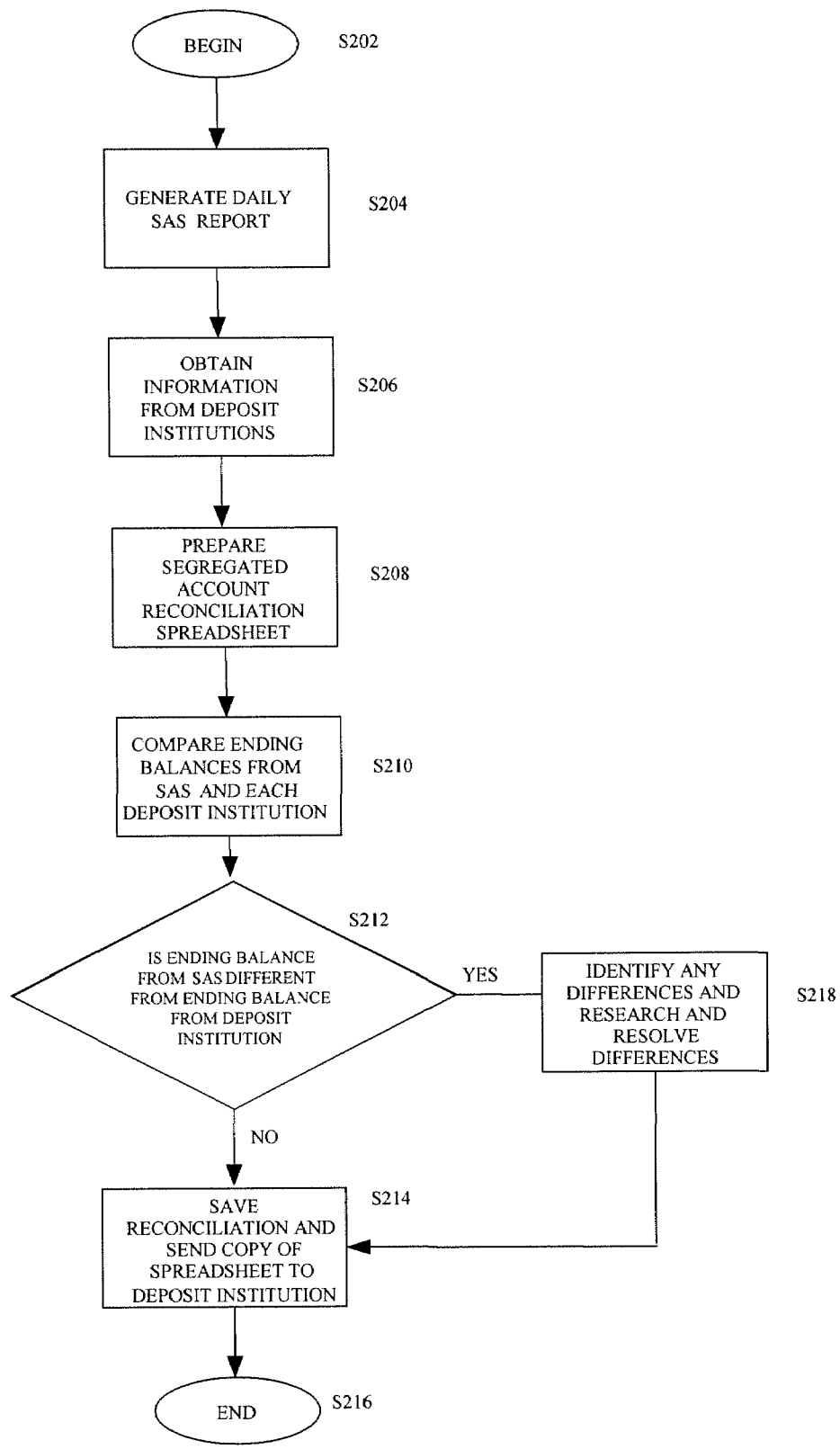
FIG. 4 is a flow chart illustrating a reconciliation process according to an exemplary embodiment of the present invention.

The management institution 10 provides the financial entities FE1-FEn with all the tools necessary to reconcile daily, or on any other periodic basis, with the deposit institutions DI1-DIq. In particular, FIG. 4 is a flow chart illustrating a reconciliation process that may be performed by the management institution 10 according to an exemplary embodiment of the present invention. In step S202, the reconciliation process may be initiated, preferably on a daily basis, but may also be initiated on any other suitable time basis. In step S204, the management institution's 10 shareholder accounting system (SAS) produces a report that reflects per deposit institution DI1-DIq information such as the beginning balance, daily subscriptions, daily withdrawals, pre-paid interest, shareholder accrued interest, ending balance and other relevant information. Preferably, data such as, for example, the rate each deposit institution has agreed to pay on deposits, the rate that the management institution has agreed to pay the financial entity on balances, the interest distributed to clients, the financial entity's revenue after interest has been paid, and the management institution's revenue after the financial entity has been paid, is maintained on a system table. Alternatively, the data can also be provided in a data format that can be downloaded to an automated reconciliation tool or software.

In step S206, the management institution 10 may obtain through, for example, on-line access or daily e-mails from the deposit institutions DI1-DIq, the daily activity and ending position for each deposit institution DI1-DIq. For online access, the management institution 10 may assign an individual username and password for each deposit institution DI1-DIq in order to maintain security. The deposit institutions can also provide a data file or the management institution 10 can screen scrape the data to be imported into an automated Reconciliation tool or software.

After all the deposit institution information is received, in step S208 of the reconciliation process, the management institution 10 generates a spreadsheet showing the aggregated account information in each deposit institution DI1-DIq as obtained directly from each deposit institution DI1-DIq and as generated by the SAS (shareholder accounting system). This aggregated account information may be arranged by financial entity, by client, or both, or in any other convenient way. In step S210, the management institution 10 uses the generated spreadsheet to compare the ending balances from the SAS Report to that obtained from each deposit institution DI1-DIq. In step S212, it is determined whether there are any differences between the ending balances. If there are no differences, in step S214, the reconciliation spreadsheet is saved in the system database, and a copy of the spreadsheet is sent to the appropriate financial entity FE1-FEn. The process then ends at step S216.

If there are differences between the ending balances from SAS and the ending balances obtained from each deposit institution DI1-DIn, the process continues to step S218, where the management institution 10 researches and identifies the differences. In this regard, differences may be immediately reported to the appropriate deposit institution 10 and preferably resolved within 24 hours. Further, a representative of each financial entity may be notified by phone, e-mail, text message, messenger or other type of communication method of any differences and how the issue is being resolved. Thus, a reconciliation process is provided that may ensure that client balances reflected in the records maintained by financial entities for their participating clients are equal to the client balances reflected in a management institution's records for those same participating clients, and that aggregate balances maintained at aggregated accounts in respective deposit institutions are in balance with an aggregate balance of the individual client balances reflected in the management institution records and the financial entity records. On a daily basis or other periodic basis, this reconciliation process in one embodiment includes comparing the aggregate balances for clients maintained by the management institution to the position maintained at the financial entity for each of its clients, comparing the aggregate balance at each deposit institution maintained by the management institution to the actual aggregate balance at each deposit institution, and in addition a control operating account in an intermediate bank used for facilitating fund transfers is reconciled to ensure the correct money movements as specified by the various deposit institution allocations has taken place.

The management institution 10 may also maintain tax records on behalf of clients of the financial entities along with tracking of interest transactions posted to the clients' accounts. Interest may be accrued daily or over any other convenient period and posted at month end or when a full liquidation occurs. Month-end may be, for example, the last Friday of the month or the actual calendar month-end. Other month-end dates may be made available depending on the financial entity needs or preferences.

Figure 5:
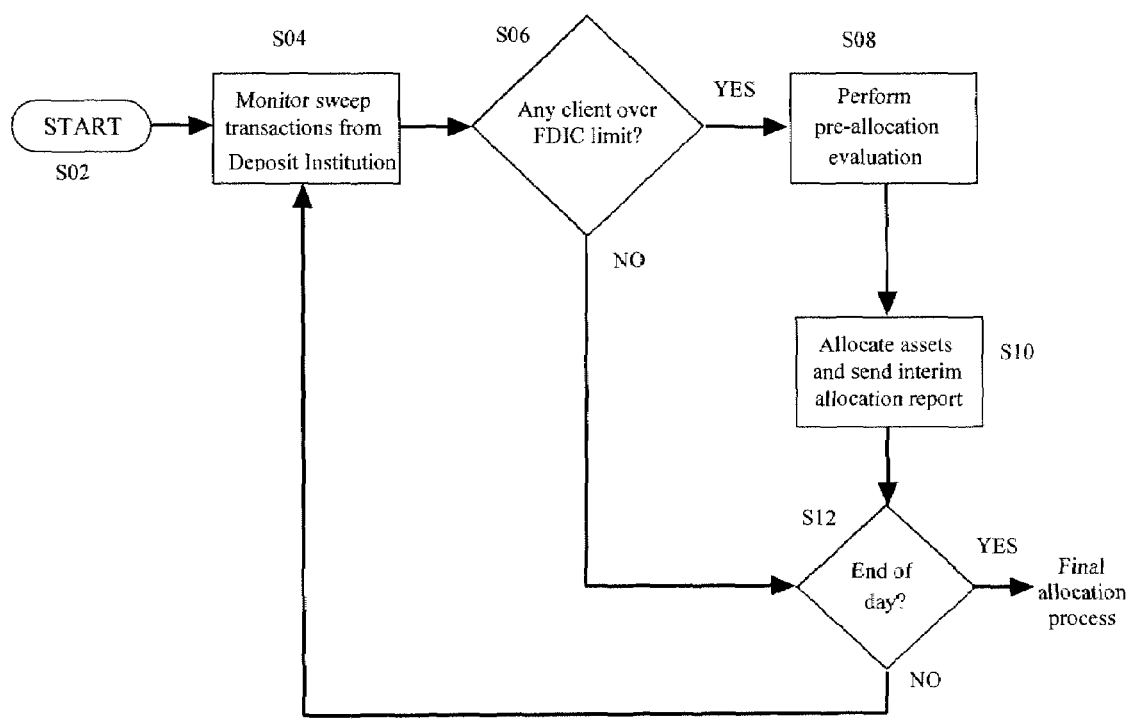
FIG. 5 is a flow chart illustrating a deposit institution interim allocation process according to an exemplary embodiment of the present invention.

Note that because fund transfers from financial entities, in some embodiments, are held in a control operating account at the intermediary bank 30 on an interim basis, e.g., several hours up to a day, before distribution to the various aggregated accounts in the different destination deposit institutions, there is a potential that portions of large deposits from a given client of the financial entity that exceed the FDIC insurance limit will be uninsured during this interim period. FIG. 5 is a flow-chart illustrating an embodiment of a intermediary bank interim allocation process that may be performed by the management institution 10 on large deposits in order to preserve FDIC insurance and for other reasons. According to an exemplary embodiment of the present invention, in order to preserve FDIC insurance eligibility for excess deposits by one client in a control operating account for a financial entity above the insurance limit transferred and held at the intermediary bank 30 during an interim period (from one to several hours to one day) before allocation to the deposit institutions DI1-DIq, the excess deposit amounts over the FDIC insurance limit may be reallocated to other eligible clients of the financial entity in the control operating account at the intermediary bank 30. In one embodiment, another client of the financial entity would be eligible for such a re-allocation if that other client has funds in one or more aggregated accounts associated with the same self clearing financial entity as the client with the incoming excess deposit, or if the incoming funds are associated with an financial entity that is not self clearing, then an eligible client would be one that had funds in an aggregated account that participates in a Program where the management institution 10 is an agent on the aggregated account at the deposit institution. A further requirement for eligibility is that the potentially eligible client does not have substantial funds that approach the level of the FDIC insurance limit in the control operating account in the intermediary bank at that time. As noted, if the management institution 10 were offering an insured deposit program to a group of banks, for example, with the banks comprising the clients, the management institution 10 could allocate funds from the control operating account for the one bank that exceeds the FDIC insurance limit with funds of another bank held in one or more aggregated accounts in one or more respective different destination deposit institutions in the same insured deposit program managed by the management institution 10, provided there was eligibility (the other clients did not have substantial funds in the control operating account), to bring the clients of the one bank's deposit in the control operating account below the FDIC insurance limit.

The interim allocation process may be performed at various times throughout the day, such as, for example, on an hourly basis, or as large transactions are processed. The interim allocation process is concerned with maintaining the amount of funds held by each client of the financial entity or the management institution below the present $100,000 limit required to maintain full FDIC insurance, even during the interim period before the funds have been allocated and transferred from the intermediary bank 30 to the various aggregated accounts in the deposit institutions DI1-DIq. Should this maximum change, the teachings of the present application would be equally applicable to any then-in effect maximum.

Referring to FIG. 5, in step S02, the interim allocation process is initiated at the beginning of the day. For purposes of the present invention, the term "day" may mean either every business day or every calendar day, as is the custom of the intermediary bank. At step S04, the process monitors the sweep transactions posted to the clients on a periodic basis, such as on an hourly basis. In step S06, the management institution determines whether any client at the intermediary bank 30 is over the $100,000 limit. If there is no client over the limit at the intermediary bank 30, the process proceeds to step S12, where the process determines whether the end of the day has arrived. In step S12, if the end of the day has arrived, the process continues on to the final processing, to be described in more detail below. Otherwise, the process returns to step S04.

In step S06, if there is a client with assets at the intermediary bank 30 over the $100,000 limit, the process continues to step S08, where the process performs an interim allocation evaluation. The process determines which clients have a deposit over $100,000 and then reshuffles account balances between the intermediary bank and one or more aggregated accounts at the respective different destination deposit institutions, so that the excess deposit is insured until the actual bank allocation takes place. During the interim allocation evaluation, the process determines if one or more clients of the financial entity that have funds held in aggregated accounts in the respective one or more destination deposit institutions associated with the financial entity are eligible in the accounting database to receive the excess funds from the excess deposit client over the $100,000 limit to bring that excess deposit client balance below the limit in the control operating account. In one embodiment, eligibility of another client to receive excess funds is determined by whether or not that other client has funds at the intermediary bank below the $100,000 FDIC limit by some predetermined amount and also by whether that particular client has funds in one or more aggregated accounts at the respective different one or more destination deposit institutions associated with the same financial entity or the same Program as the incoming excess client deposit, or in one or more aggregated accounts that commingle funds from Programs of the financial entity in one or more destination deposit institutions DI1-DIq associated with that financial entity, that can be reallocated to replace the excess amount of the deposit of the one client in the control operating account. Thus, during this step, the process determines how best to reallocate the assets among the other clients of that financial entity to ensure that after the reallocation, none of the clients with funds at the intermediary bank 30 have assets that total over $100,000, or at least minimize the uninsured assets to the extent possible.

In step S10, the process allocates the assets among the clients according to the evaluation performed in step S08. The process may also generate an interim allocation report and send the report via fax, e-mail, text message, or by any other suitable communication method to the financial entities and the deposit institutions involved. The process then continues to step S12, where the process determines whether the end of the day has arrived, as discussed above. Thus, this interim allocation process obtains, after the reallocation, FDIC insurance for the excess funds of a client over $100,000 when those funds are brought into the control operating account in the intermediary bank 30 in the interim period prior to allocation among the deposit institutions DI1-DIq. If the end of the day or some other convenient point has arrived, then accounting processes are performed to insure that the client funds of eligible clients used to replace the one clients funds in the control operating account receive the specified interest rate for the account as if no interim allocation had taken place.

It should be noted that the foregoing process relating to client amounts in control operating accounts, in some embodiments may be separate and apart from the previously discussed allocation among deposit institutions to meet minimum and maximum levels.

As noted previously, a holdback withdrawal amount may be applied against those deposit institutions that are designated as holdback deposit institutions. A deposit institution may be designated a holdback institution if it agrees to a temporary withdrawal of funds from its account which may be later used to settle late day client service and fee transactions, for example, cards/checks/ACH/fees, to name a few, that may be available for processing after the daily deposit institution settlement deadline, typically 4:00 pm. The holdback withdrawal may be factored into the first runs and/or later runs of the deposit institution allocation process on the sweep files, i.e., subtracted from credits to reduce the deposits to be allocated or added to debits to increase the dollar amount withdrawn from the holdback deposit institution.

Figure 6:
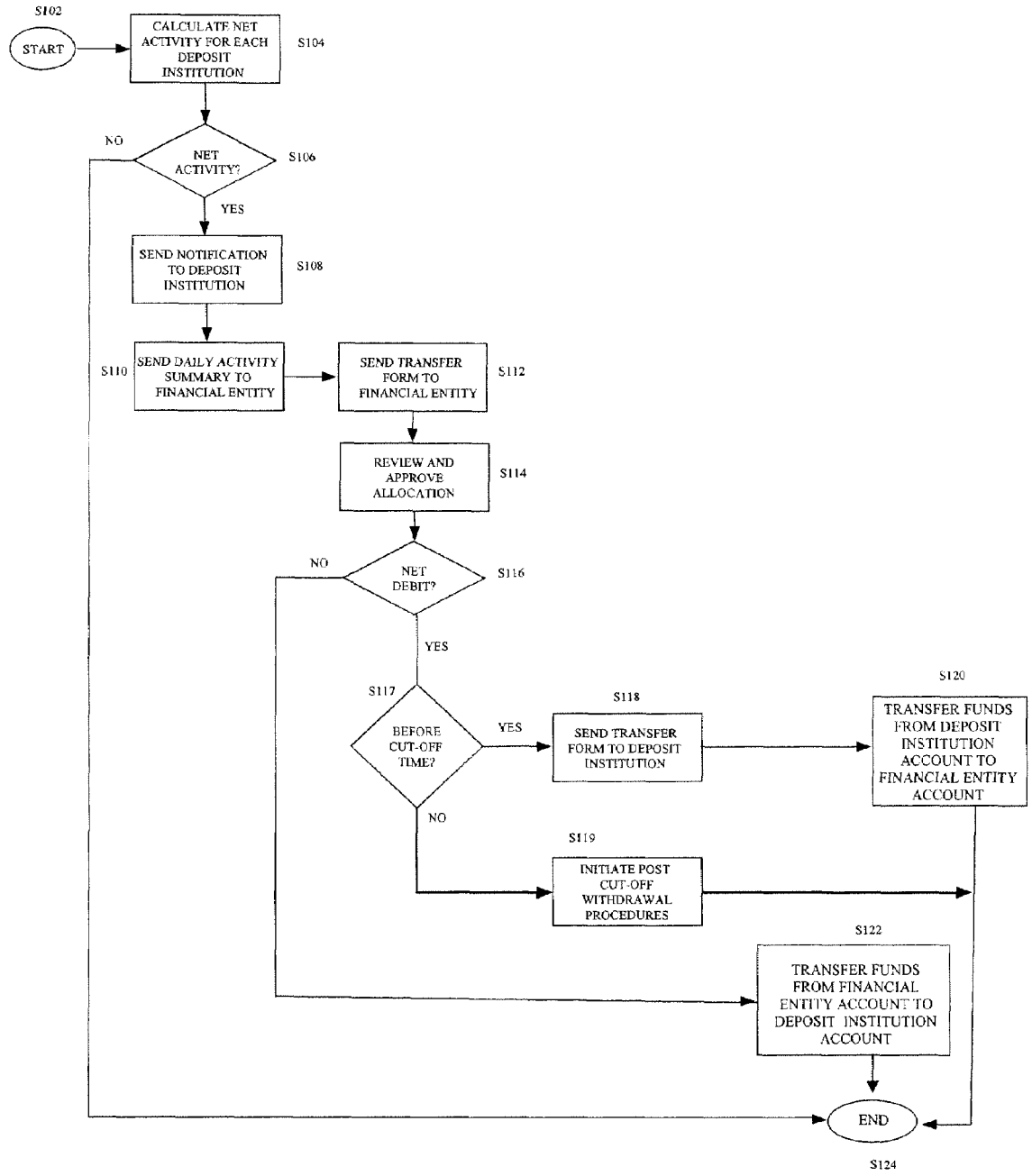
FIG. 6 is a flow chart illustrating a deposit institution final allocation process according to another exemplary embodiment of the present invention.

FIG. 6 is a flow chart illustrating a deposit institution allocation process that can be performed by the management institution 10 according to another exemplary embodiment of the present invention incorporating a method, such as the holdback process or financial entity funding, for funding late withdrawals. The process according to the present embodiment is the same as the embodiment of FIG. 3 except for the addition of steps S117 and S119, which address withdrawal requests made after the deposit institution withdrawal cut-off time. In particular, after the financial entity reviews and approves the transfer form in step S114, and it has been determined that there is a net debit in step S116, the process may continue to step S117. In step S117 the financial entity initiates the movement of funds by first determining whether the request for withdrawal (the net debt) from the deposit institution occurs prior to the cut-off time at the deposit institution. If prior to the cut-off time, the process continues on to step S118, where, as explained previously, the financial entity completes and sends a debit transfer form to the deposit institution.

In step S117, if it is determined that the request for withdrawal occurs after the cut-off time, the process may continue to step S119, where post cut-off time withdrawal procedures are initiated. The post cut-off time withdrawal procedures may include, for example, a procedure in which late withdrawals are covered by the financial entity concurrently funding the late withdrawals, or a procedure in which funds are held back from one or more deposit institutions to cover the late withdrawals. These two types of post cut-off time withdrawal procedures are discussed below.

In the financial entity funded late withdrawals, one or more financial entity account(s) may be established for the financial entity in the program at one or more deposit institutions. The financial entity may deposit an amount of funds in a financial entity account that is equal to the amount of funds withdrawn from the deposit institution substantially concurrently with that withdrawal. Thus, the change to the net daily activity is zero and the overall deposit institution allocation procedure is not affected.

In the hold-back procedure for funding late withdrawals, funds are held back from the deposit institution to cover the late withdrawals. The amount held back from pre-cutoff transactions may be estimated based on prior transaction history. The allocation process will take into account the amount to be held back at a particular deposit institution in its distribution of funds allocated to or withdrawn from the given deposit institution. If the distribution of funds for the given deposit institution is a credit, the allocation process may reduce the deposit to the deposit institution by an amount equal to the hold back amount. If the distribution of funds for the given deposit institution is a debit, the allocation process may increase the withdrawal from the deposit institution by an amount that is equal to the hold back amount.

Referring to step S119, the post cut-off time withdrawal procedures may be performed to cover all late transactions (for example, cards/checks/ACH/fees, etc.) or transaction data not processed in the earlier runs of the allocation process. The management institution 10 may determine the net of these transactions, and transfer the appropriate amount from the holdback funds to cover these late transactions. The management institution 10 then determines any excess holdback amount not required to fund these transactions. The excess holdback not required to fund these transactions may be deposited back to the designated holdback deposit institutions as additional wires, or through other suitable methods.

The process then continues to step S124, where the process ends. If the post cut-off withdrawal procedure involves funding by the financial entity, an equal amount of funds may be later deposited in the financial entity account from the deposit institution. Thus, if the financial entity is funding late transactions, a deposit is made by the financial entity to its own account, to offset the late withdrawals. The reshuffle of accounts at the end of the day, determines which deposit institutions the financial entities deposit is assigned to.

Figure 7:
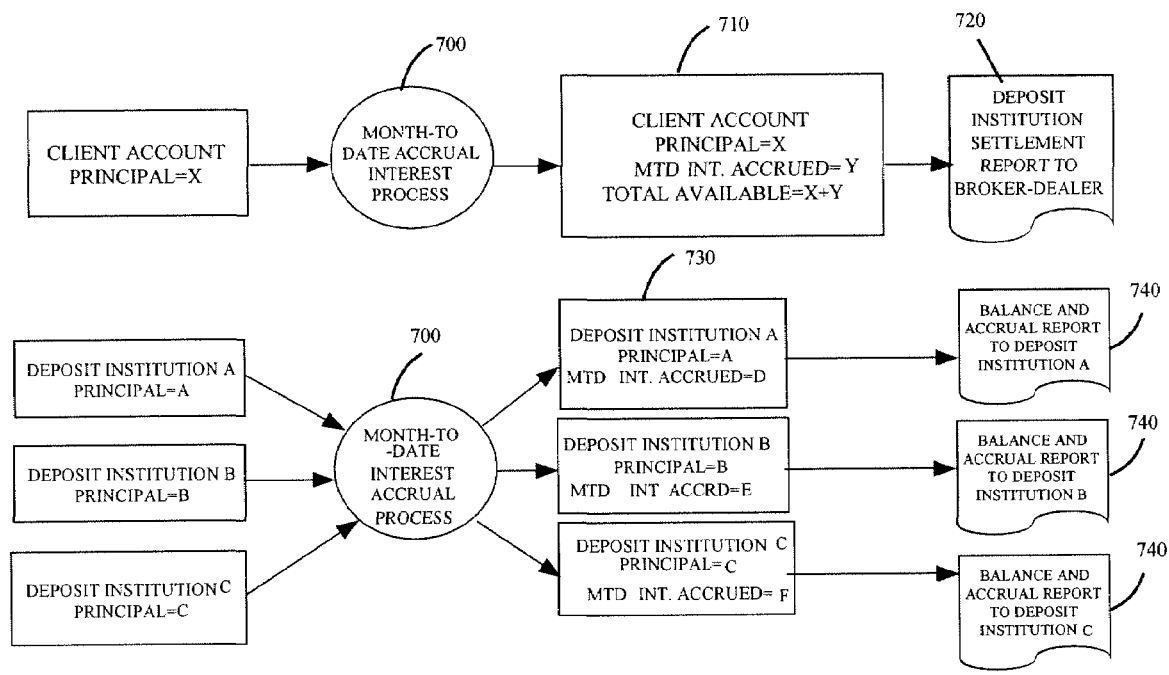
FIG. 7 shows a month-to-date (MTD) interest accrual process executed by the management institution according to an exemplary embodiment of the present invention.

FIG. 7 shows a month-to-date (MTD) accrual process 700 executed by the management institution 10 according to an exemplary embodiment of the present invention. As shown in FIG. 7, the management institution 10 calculates 710 the MTD interest for a customer using the customer's principal balance. The management institution 10 may then generate a deposit institution settlement report 720 that includes the MTD interest information, and sends the report 720 to the client's financial entity. The deposit institution settlement report 720 may be generated on a nightly basis, or on any other basis. The management institution 10 may provide daily compounding interest, or if appropriate, may also provide a simple interest calculation.

As shown in FIG. 7, the management institution 10 may also calculate 730 the interest, per account, at the deposit institution level by using the end-of-day balance at each deposit institution (e.g., Deposit Institutions A, B and C in FIG. 7) in which the client's funds have been deposited. The management institution 10 may generate balance and accrual reports 740 for each deposit institution using the end-of-day balances. In one embodiment, the management institution 10 may calculate the interest rate the deposit institution agreed to pay on balances. This calculation may be broken into two parts: a calculation of interest to be distributed to clients, which is credited to the MMDA at month end as interest; and a calculation of a remainder amount, which may comprise revenue that is paid to the management institution, which may then pay a portion to the financial entity.

The deposit institutions typically only pay interest at month-end. Thus, according to at least one exemplary embodiment of the present invention, the management institution 10 may employ a prepaid interest process to pay customers on full liquidations that occur prior to month-end.

Figure 8:
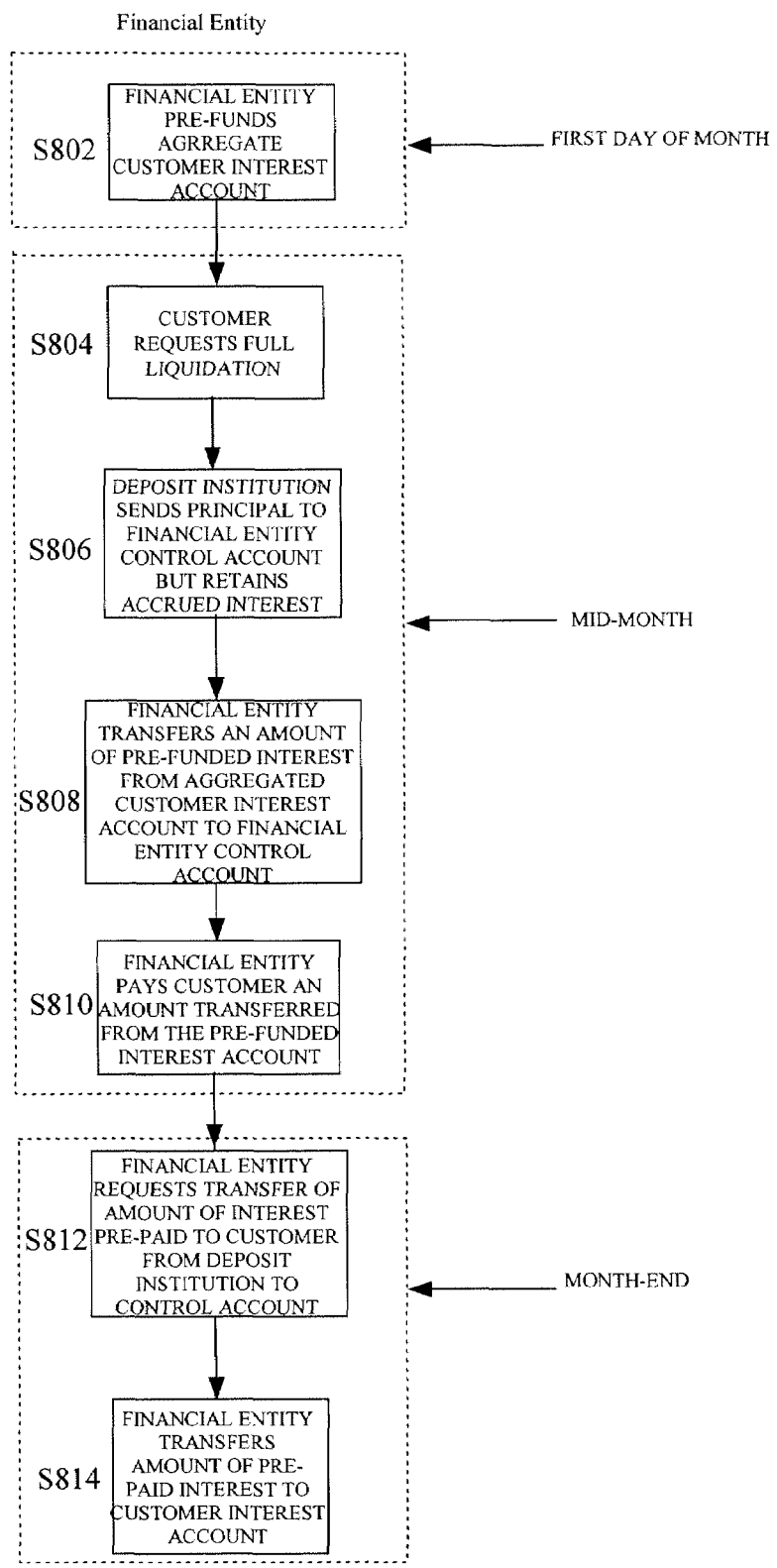
FIG. 8 is a flow chart illustrating a prepaid interest process performed by the management institution according to an exemplary embodiment of the present invention.

FIG. 8 is a flow chart illustrating a prepaid interest process used by the management institution 10 according to an exemplary embodiment of the present invention. In step S802 a financial entity pre-funds a customer interest account, which may be per customer or an aggregated account for a plurality of customers based on an estimate of how many customer will closeout their respective accounts in that period. This customer interest account is preferably held in the financial entity's name at an intermediary deposit institution but may be set up otherwise as appropriate. Step S802 may be performed at the first day of the month, but may also be performed on a preferred periodic or other convenient basis. Alternatively, the management institution 10 or another entity may pre-fund the customer interest account. At step S804, which takes place at some day during the month, the customer may request full liquidation of an account with funds held at one or more of the deposit institutions. At step S806, the deposit institution sends the principal amount in the account to the financial entity control account and retains the accrued interest. In step S808, the amount due to the customer is determined based on the customer's arrangement with the financial entity and this amount is transferred from the pre-funded interest, i.e., prepaid interest, from the customer interest account to the financial entity control account to cover the amount of interest required to be delivered to the customer. In step S810, the financial entity pays the customer the principal, and the interest due (pre-paid interest) from the financial entity control account based on the arrangement with the customer.

At month end the appropriate interest is posted by the deposit institution to the MMDA. Then in step S812, the interest that was pre-paid and transferred to the customer is requested to be transferred from the deposit institution to the financial entity's control account. In other words, the FI reimburses itself for the interest that was pre-paid to the customer. After receiving the amount of pre-paid interest, in step S814, the financial entity transfers all or a portion of the pre-paid interest to the customer interest account. Thus, the financial entity can be refunded the amount of the interest the financial entity pre-paid for and transferred to the customer.

Figure 9:
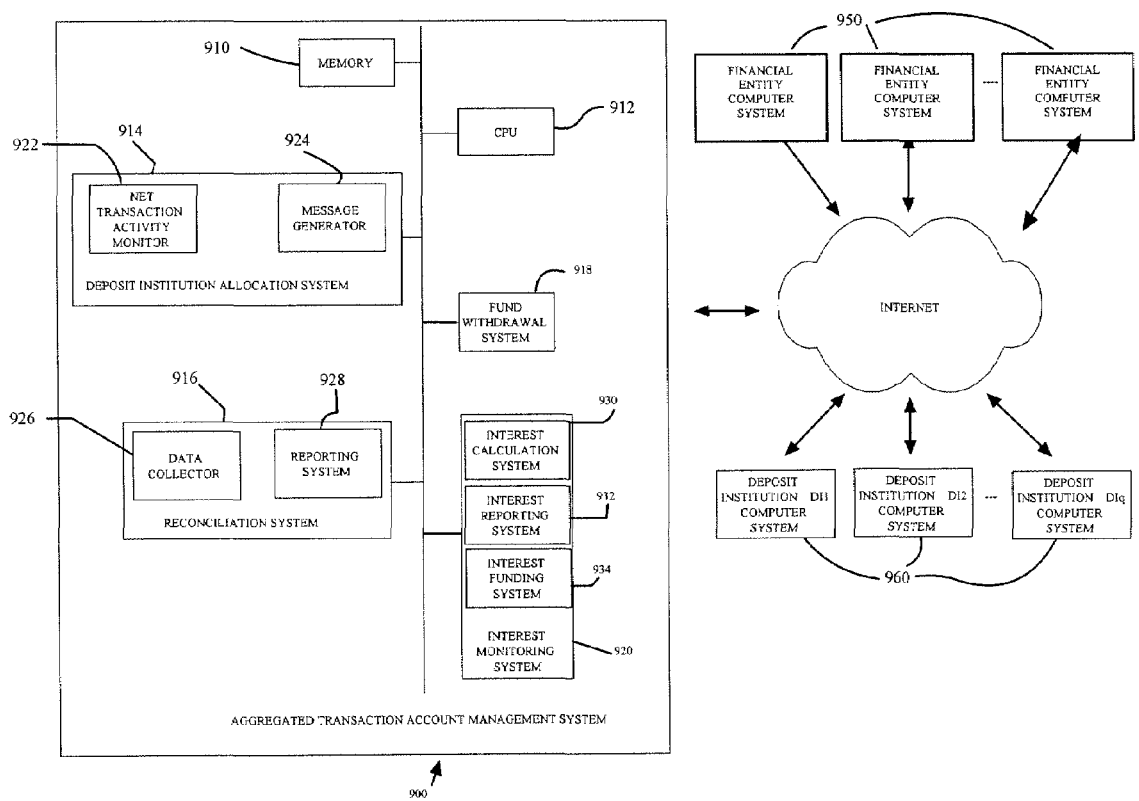
FIG. 9 is a block diagram showing an Internet-based aggregated account management system according to an exemplary embodiment of the present invention.

FIG. 9 is a block diagram showing an Internet-based aggregated transaction account management system, generally designated by reference number 900, according to another exemplary embodiment of the present invention. It should be appreciated that the aggregated account management system 900 according to the present invention need not be Internet-based, but may instead, for example, be part of a closed network that allows limited access to deposit institution and financial entity records for added security. The management system 900 includes a memory 910, a CPU 912, a deposit institution allocation system 914, a reconciliation system 916, a fund withdrawal system 918 and an interest monitoring system 920. The CPU 912 executes code to perform the various management functions performed by the management system 900. The management system 900 communicates with the financial entity computer systems 950 and the deposit institution computer systems 960 to manage the aggregated accounts held at each deposit institution.

The deposit institution allocation system 914 allocates deposits to and withdrawals from the aggregated accounts in each deposit institution DI1-DIq. The deposit institution allocation system 914 includes a net transaction activity monitor 922 that calculates the net transaction activity required at each deposit institution to satisfy the predetermined program rules described above and other rules as required for each program held at each deposit institution DI1-DIq. The deposit institution allocation system 914 also includes a message generator 924 that generates one or more messages and settlement wires regarding withdrawal of funds from or deposit of funds to each of the aggregated accounts. Messages may, for example, be in the form of e-mail, facsimile, text message or other form of communication. Such messages may be sent to the financial entities FE1-FEn and/or the deposit institutions DI1-DIq for notice or request for approval, and may include information such as, for example, the amount withdrawn or deposited and the reason for the withdrawal or deposit.

The reconciliation system 916 reconciles inconsistencies between system reported deposit institution periodic activity data and observed deposit institution periodic activity data reported by the deposit institutions. The reconciliation system 916 includes a data collector 926 that receives the reported deposit institution periodic activity data from each deposit institution DI1-DIq. Such data may include, for example, the beginning balance for the period, the ending balance for the period, the periodic subscription deposits, the periodic withdrawals, pre-paid interest and accrued interest, posted interest and adjustments. The reconciliation system 916 also includes a reporting system 928 that reports any inconsistencies between the reported deposit institution periodic activity data and the activity as determined by the present process. Note that the data structure for withdrawals, and/or deposits can be bank data files, such as BAI files or the management institution 10 could screen scrape the data off a website.

The system 900 additionally includes a fund withdrawal system 918 and a interest monitoring system 920. The fund withdrawal system 918 initiates a post cut-off time withdrawal procedure to withdraw funds from a deposit institution to satisfy a net debit after a cut-off time has passed. The post cut-off time withdrawal procedure may include, for example, funding the net debit from a corresponding financial entity account or holding back an amount during the allocation process to cover the post cut-off time net debit.

The interest monitoring system 920 monitors interest payments made for client accounts, where each of the client accounts send deposits to and receive withdrawals from a corresponding one or more of the aggregated accounts in one or more deposit institutions. The interest monitoring system 920 includes an interest calculation system 930 that, for each client account, calculates a term-to-date interest due to the client account based on amounts withdrawn from or deposited to the aggregated accounts. The term is preferably one month, but may also be any other suitable period of time. The interest monitoring system 920 also includes an interest reporting system 932 that, for each client account, generates a report on a periodic basis that includes the calculated term-to-date interest due to the client account based on the amounts withdrawn from or deposited to the aggregated accounts. The interest monitoring system 920 may also include an interest funding system 934 that, for each client account, pre-funds interest to be paid to the client account as a result of a midterm liquidation request from the corresponding client.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or manual operations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for managing a plurality of Federal Deposit Insurance Corporation (FDIC)-insured, interest-bearing aggregated accounts held in a group of deposit institutions, comprising:

(1) accessing, by one or more computers, one or more databases comprising:
   (a) aggregated account information for a plurality of the FDIC-insured and interest-bearing aggregated accounts held in the group of deposit institutions, wherein funds from client transaction accounts of a plurality of clients are aggregated with funds of other client transaction accounts in the aggregated accounts held in the deposit institutions, wherein each of the respective deposit institutions holds one or more of the aggregated accounts; and
   (b) client transaction account information for each of the respective client transaction accounts comprising:
      (i) a respective client asset balance in the respective client transaction account;
      (ii) transaction data for the respective client transaction account; and
      (iii) a respective balance of funds from the respective client transaction account held in each of one or more of the FDIC-insured and interest-bearing aggregated accounts holding funds of the respective client transaction account; and (2) allocating, by one or more computers, deposits to and withdrawals from the aggregated accounts, the step of allocating comprising:
   (a) accessing, by the one or more computers, transaction data comprising deposit amounts to and/or withdrawal amounts from one or more of the client transaction accounts for a sub-period of time such as one or more hours, days or weeks;
   (b) calculating, by the one or more computers, for each of a respective one or more of the aggregated accounts held in each of a plurality of the deposit institutions in the group, a first net transaction amount with respect to the respective aggregated account based on transaction data for the sub-period of time for client transaction accounts with funds held therein;
   (c) determining, by the one or more computers, for at least the respective one of the aggregated accounts held in each of a plurality of the deposit institutions, whether the respective one of the aggregated accounts has a no-withdrawal designation indicating such account is not to receive withdrawals for one or more sub-periods of time based at least in part on a number of withdrawals made or to be made during the period of time from the respective one aggregated account held in the respective deposit institution;
   (d) selecting, by the one or more computers, at least one aggregated account in one of the deposit institutions from among the group of the deposit institutions to which to deposit or to withdraw funds, while avoiding withdrawing funds for the respective sub-period of time from each of one or more of the other aggregated accounts based at least in part on whether a no-withdrawal designation is determined for each of the one or more other respective aggregated accounts;
   (e) allocating, by the one or more computers, the respective client asset balance of funds of a plurality of the respective client transaction accounts among a plurality of the aggregated accounts in the group so that one or more of the aggregated accounts that has a no-withdrawal designation and at least a first net transaction amount that is negative has a net balance of funds that is not decreased for the sub-period in time;

(3) generating instructions to withdraw funds from or depositing or having deposited funds to the at least one of the aggregated accounts based on the allocating step; and (4) updating, by the one or more computers, the one or more databases with information on which of the deposit institutions are holding funds of a plurality of the client transaction accounts.

2. The method of claim 1, wherein the selecting step is performed at least in part by determining a relationship between a respective amount of net assets in one of the at least one of the aggregated accounts in the group of aggregated accounts and a respective minimum deposit cap.

3. The method of claim 2, wherein the selecting step further selects deposit institutions based, at least in part, on determining a relationship between the respective amount of net assets in the at least one aggregated account held at one of the deposit institutions and both the respective minimum deposit cap and a respective maximum deposit cap.

4. The method of claim 3, wherein the relationship comprises whether the amount of net assets in the one aggregated account held at that deposit institution is below the respective minimum cap, and further comprises, if these net assets are above the respective minimum cap, whether the amount of net assets in the aggregated account held at that deposit institution is below the respective maximum cap.

5. The method of claim 3, wherein the relationship comprises how far the amount of net assets in the one aggregated account held at that deposit institution is below the respective minimum cap, and further comprises, if these net assets are above the minimum cap, how far the net assets in the aggregated account held at that deposit institution is below the respective maximum cap.

6. The method of claim 3, wherein the one or more databases aggregated account information comprises information indicating an association of each of a plurality of the aggregated accounts with at least one financial entity and holding funds of a plurality of clients of the at least one financial entity, and wherein the client transaction account information comprises information of each of a plurality of the clients having a client asset balance in a respective client transaction account associated with at least one financial entity, and wherein at least one of the aggregated accounts held at one of the deposit institutions associated with the at least one financial entity has its respective maximum deposit cap set equal to its respective minimum deposit cap, and wherein the step of selecting further comprises by-passing withdrawals and deposits of funds for the at least one aggregated account that has its respective maximum deposit cap set equal to its respective minimum deposit cap if the net assets for this aggregated account are substantially equal to or greater than the minimum cap for that aggregated account.

7. The method of claim 6, wherein, for each aggregated account in which the maximum deposit cap is equal to the minimum deposit cap and the net assets are substantially equal to the minimum or the maximum deposit cap, the step of allocating further comprises offsetting withdrawals from this aggregated account with deposits from another aggregated account associated with the at least one financial entity held at a different deposit institution in which its respective maximum deposit cap is not equal to its respective minimum deposit cap.

8. The method of claim 2, wherein the allocating step further comprises allocating a respective amount to one of the at least one aggregated accounts based at least in part on the relationship between the respective amount of net assets in the one aggregated account held at that deposit institution and the respective minimum deposit cap.

9. The method of claim 8, wherein the allocating respective amount step allocates an amount to the one aggregated account based, at least in part, on the relationship between the respective amount of net assets in the at least one aggregated account and both the respective minimum deposit cap and a respective maximum deposit cap for that aggregated account in that deposit institution.

10. The method of claim 2, wherein the relationship is whether the amount of net assets in the at least one aggregated account is below the respective minimum cap.

11. The method of claim 2, wherein the relationship is how far the net assets in the one aggregated account held at that respective deposit institution are below or above the respective minimum cap.

12. The method of claim 2, wherein the allocating amounts step further comprises allocating the respective amount to the at least one aggregated account based, at least in part, on one or more rules.

13. The method of claim 2, wherein the minimum cap is a cap negotiated with the depository institution.

14. The method of claim 1, wherein the selecting step is performed at least in part by determining a relationship between respective net assets in each of a plurality of the aggregated accounts and a respective minimum deposit cap associated with each of the plurality of the respective aggregated accounts.

15. The method of claim 14, wherein the selecting step selects a plurality of the aggregated accounts from among the group of aggregated accounts to which to deposit or to withdraw funds.

16. The method of claim 14, wherein the selecting step further selects deposit institutions based, at least in part, on determining a relationship between the respective amount of net assets in each of the plurality of aggregated accounts and both the respective minimum deposit cap and a respective maximum deposit cap.

17. The method of claim 16, wherein the selecting step selects a plurality of the aggregated accounts from among the group of aggregated accounts to which to deposit or to withdraw funds.

18. The method of claim 1, wherein the allocating step further comprises selecting one of the deposit institutions holding one of the aggregated accounts to which to deposit or to withdraw funds based, at least in part, on one or more rules.

19. The method of claim 1, wherein the allocating client asset balances in the client transaction accounts among a plurality of the aggregated accounts is performed only one time per day to substantially match the most recent allocation of funds.

20. The method of claim 1, further comprising allocating client asset balances in the client transaction accounts associated with the one financial entity among one or more of the aggregated accounts based, at least in part, on one or more rules.

21. The method of claim 20, wherein one rule of the one or more rules comprises limiting net assets of a client in at least one of the aggregated accounts in the group held at a given deposit institution to less than a predetermined amount.

22. The method of claim 1, wherein the plurality of client transaction accounts is associated with a program, and wherein the step of withdrawing funds further depends on predefined program rules associated with the program, the predefined program rules comprising rules relating to one or more of the following: level of FDIC insurance provided by the program, total client transaction account balance, the one or more deposit institutions attached to the client transaction account and the client account balance at each deposit institution, and whether or not the client has chosen to opt out of one or more of the deposit institutions.

23. The method of claim 1, wherein the step of allocating further comprises a step of approving the information regarding the net transaction activity.

24. The method of claim 23, wherein the one or more databases aggregated account information comprises information indicating an association of each of a plurality of the aggregated accounts with at least one financial entity and holding funds of a plurality of clients of the at least one financial entity, and wherein the client transaction account information comprises information of each of a plurality of the clients having a client asset balance in a respective client transaction account associated with at least one financial entity, and
    wherein the step of approving comprises
        collecting reported financial institution periodic activity data from each financial institution; and
        reconciling inconsistencies between reported deposit institution periodic activity data and observed deposit institution periodic activity data.

25. The method of claim 1, wherein the step of allocating further comprises a step of notifying each deposit institution of any allocation thereto.

26. The method of claim 25, wherein, for each deposit institution where a withdrawal allocation is to be made, the step of notifying comprises steps of generating and sending a message to the deposit institution in one of the following manners: in person, by mail, by automated teller machine, and using the telephone and distributing by mail and messenger service.

27. The method of claim 1, wherein the selecting step determines if there is a data field that indicates whether to avoid withdrawing funds from or depositing funds to the different one of the aggregated accounts.

28. The method of claim 1, wherein the selecting step comprises selecting a first one of the aggregated accounts during a first sub-period of time, and selecting a second one of the aggregated accounts during a second sub-period of time.

29. The method of claim 1, wherein aggregated account information in the one or more databases comprises information indicating an association of each of a plurality of the aggregated accounts with at least one financial entity and holding funds of a plurality of clients of the at least one financial entity, and wherein the client transaction account information comprises information of each of a plurality of the clients having a client asset balance in a respective client transaction account associated with at least one financial entity.

30. The method of claim 29, further comprising allocating client asset balances in the client transaction accounts associated with the one financial entity among one or more of the aggregated accounts based, at least in part, on one or more rules.

31. The method of claim 30, wherein one rule of the one or more rules comprises limiting net assets of a client in at least one of the aggregated accounts in the group held at a given deposit institution to less than a predetermined amount.

32. The method of claim 30, wherein the allocating client asset balances in the client transaction accounts among a plurality of the aggregated accounts is performed only one time per day to substantially match the most recent allocation of funds.

33. The method of claim 29, further comprising allocating client asset balances in the client transaction accounts associated with the one financial entity among one or more of the aggregated accounts based, at least in part, on one or more rules.

34. The method of claim 33, wherein one rule of the one or more rules comprises limiting net assets of a client in at least one of the aggregated accounts in the group held at a given deposit institution to less than a predetermined amount.

35. The method of claim 29, wherein the allocating client asset balances in the client transaction accounts among a plurality of the aggregated accounts is performed only one time per day to substantially match the most recent allocation of funds.

36. The method of claim 29, wherein the calculating an aggregated transaction amount comprises:
    receiving a sweep file associated with the at least one financial entity, the sweep file comprising fund deposits and/or fund withdrawals from a plurality of the client transaction accounts associated with the at least one financial entity;
    posting by the one or more computers the fund deposits and/or the fund withdrawals and any other instructions in said sweep file associated with plurality of client transaction accounts of the at least one financial entity; and
    determining by the one or more computers the total net transaction for the sweep file.

37. The method of claim 29, wherein the step of allocating further comprises a step of, for the at least one financial entity, reporting information regarding a net transaction activity associated with the client transaction accounts of the at least one financial entity.

38. The method of claim 37, wherein the step of reporting comprises generating a deposit institution allocation report comprising information regarding one or more of the following: an amount of the net transaction activity required for the corresponding deposit institution, and a reason for the net transaction activity required for the corresponding deposit institution.

39. The method of claim 1, wherein the determining step (c) determines whether the respective one of the aggregated accounts has a no-withdrawal designation indicating that such account is not to receive withdrawals for one or more sub-periods of time based at least in part on a number of withdrawals made or to be made during the period of time from the respective one aggregated account held in the respective deposit institution by one or more of check, debit card, credit card, ACH transfer, or wire transfer.

40. The method of in claim 1, wherein the no withdrawal designation is applied to one or more of the aggregated accounts in each of a plurality of the deposit institutions to indicate no withdrawal for the respective aggregated account for a given day, a given set of days, or a given week.

41. The method of in claim 1, wherein the generating instructions step (3) comprises generating instructions to withdraw funds from the at least one of the aggregated accounts by wire.

42. The method of in claim 1, wherein the generating instructions step (3) comprises generating instructions to deposit funds in at least one of the aggregated accounts that has a no withdrawal designation for the sub-period.

43. A program product for managing a plurality of Federal Deposit Insurance Corporation (FDIC)-insured, interest-bearing aggregated accounts held in a group of deposit institutions, comprising:

one or more computer usable media having computer readable program code embodied therein or among them, to be executed by a computer, the computer readable program code comprising
(1) program code for accessing, by one or more computers, one or more databases comprising:
  (a) aggregated account information for a plurality of the FDIC-insured and interest-bearing aggregated accounts held in the group of deposit institutions, wherein funds from client transaction accounts of a plurality of clients are aggregated with funds of other client transaction accounts in the aggregated accounts held in the deposit institutions, wherein each of the respective deposit institutions holds one or more of the aggregated accounts; and
  (b) client transaction account information for each of the respective client transaction accounts comprising:
    (i) a respective client asset balance in the respective client transaction account;
    (ii) transaction data for the respective client transaction account; and
    (iii) a respective balance of funds from the respective client transaction account held in each of one or more of the FDIC-insured and interest-bearing aggregated accounts holding funds of the respective client transaction account; and
(2) program code for allocating, by one or more computers, deposits to and withdrawals from the aggregated accounts, the step of allocating comprising:
  (a) accessing, by the one or more computers, transaction data comprising deposit amounts to and/or withdrawal amounts from one or more of the client transaction accounts for a sub-period of time such as one or more hours, days or weeks;
  (b) calculating, by the one or more computers, for each of a respective one or more of the aggregated accounts held in each of a plurality of the deposit institutions in the group, a first net transaction amount with respect to the respective aggregated account based on transaction data for the sub-period of time for client transaction accounts with funds held therein;
  (c) determining, by the one or more computers, for at least the respective one of the aggregated accounts held in each of a plurality of the deposit institutions, whether the respective one of the aggregated accounts has a no-withdrawal designation indicating such account is not to receive withdrawals for one or more sub-periods of time based at least in part on a number of withdrawals made or to be made during the period of time from the respective one aggregated account held in the respective deposit institution;
  (d) selecting, by the one or more computers, at least one aggregated account in one of the deposit institutions from among the group of the deposit institutions to which to deposit or to withdraw funds, while avoiding withdrawing funds for the respective sub-period of time from each of one or more of the other aggregated accounts based at least in part on whether a no-withdrawal designation is determined for each of the one or more other respective aggregated accounts;
  (e) allocating, by the one or more computers, the respective client asset balance of funds of a plurality of the respective client transaction accounts among a plurality of the aggregated accounts in the group so that one or more of the aggregated accounts that has a no-withdrawal designation and at least a first net transaction amount that is negative has a net balance of funds that is not decreased for the sub-period in time;
  (3) program code for generating instructions to withdraw funds from or depositing or having deposited funds to the at least one of the aggregated accounts based on the allocating step; and
  (4) program code for updating, by the one or more computers, the one or more databases with information on which of the deposit institutions are holding funds of a plurality of the client transaction accounts.

44. The program product of claim 43, wherein the program code for selecting further comprises program code for selecting a first one of the aggregated accounts during a first sub-period of time, and for selecting a second one of the aggregated accounts during a second sub-period of time.

45. The program product of claim 43, wherein the program code for determining (c) determines whether the respective one of the aggregated accounts has a no-withdrawal designation indicating that such account is not to receive withdrawals for one or more sub-periods of time based at least in part on a number of withdrawals made or to be made during the period of time from the respective one aggregated account held in the respective deposit institution by one or more of check, debit card, credit card, ACH transfer, or wire transfer.

46. The program product of in claim 43, wherein the no withdrawal designation is applied to one or more of the aggregated accounts in each of a plurality of the deposit institutions to indicate no withdrawal for the respective aggregated account for a given day, a given set of days, or a given week.

47. A system for managing a plurality of Federal Deposit Insurance Corporation (FDIC)-insured, interest-bearing aggregated accounts held in a group of deposit institutions, comprising:
  one or more computers operably connected to the database for implementing the following components:
  (1) a component for accessing, by the one or more computers, one or more databases comprising:
    (a) aggregated account information for a plurality of the FDIC-insured and interest-bearing aggregated accounts held in the group of deposit institutions, wherein funds from client transaction accounts of a plurality of clients are aggregated with funds of other client transaction accounts in the aggregated accounts held in the deposit institutions, wherein each of the respective deposit institutions holds one or more of the aggregated accounts; and
    (b) client transaction account information for each of the respective client transaction accounts comprising:
      (i) a respective client asset balance in the respective client transaction account;
      (ii) transaction data for the respective client transaction account; and
      (iii) a respective balance of funds from the respective client transaction account held in each of one or more of the FDIC-insured and interest-bearing aggregated accounts holding funds of the respective client transaction account; and
  (2) a component for allocating, by the one or more computers, deposits to and withdrawals from the aggregated accounts, the allocating component configured for:
    (a) accessing, by the one or more computers, transaction data comprising deposit amounts to and/or withdrawal amounts from one or more of the client transaction accounts for a sub-period of time such as one or more hours, days or weeks;
    (b) calculating, by the one or more computers, for each of a respective one or more of the aggregated accounts held in each of a plurality of the deposit institutions in the group, a first net transaction amount with respect to the respective aggregated account based on transaction data for the sub-period of time for client transaction accounts with funds held therein;

(c) determining, by the one or more computers, for at least the respective one of the aggregated accounts held in each of a plurality of the deposit institutions, whether the respective one of the aggregated accounts has a no-withdrawal designation indicating such account is not to receive withdrawals for one or more sub-periods of time based at least in part on a number of withdrawals made or to be made during the period of time from the respective one aggregated account held in the respective deposit institution;

(d) selecting, by the one or more computers, at least one aggregated account in one of the deposit institutions from among the group of the deposit institutions to which to deposit or to withdraw funds, while avoiding withdrawing funds for the respective sub-period of time from each of one or more of the other aggregated accounts based at least in part on whether a no-withdrawal designation is determined for each of the one or more other respective aggregated accounts;

(e) allocating, by the one or more computers, the respective client asset balance of funds of a plurality of the respective client transaction accounts among a plurality of the aggregated accounts in the group so that one or more of the aggregated accounts that has a no-withdrawal designation and at least a first net transaction amount that is negative has a net balance of funds that is not decreased for the sub-period in time;

(3) a component for generating instructions to withdraw funds from or depositing or having deposited funds to the at least one of the aggregated accounts based on the allocating operation; and (4) a component for updating, by the one or more computers, the one or more databases with information on which of the deposit institutions are holding funds of a plurality of the client transaction accounts.

48. The system of claim 47, wherein the withdrawal component comprises
a message generator that generates one or more messages for facilitating withdrawal of funds from or deposit of funds to one or more of the aggregated accounts their respective associated deposit institutions.

49. The system of claim 47, wherein the selection component is configured to select a first one of the aggregated accounts during a first sub-period of time, and to select a second one of the aggregated accounts during a second sub-period of time.

50. The system of claim 47, wherein the determining component (c) is configured to determine whether the respective one of the aggregated accounts has a no-withdrawal designation indicating that such account is not to receive withdrawals for one or more sub-periods of time based at least in part on a number of withdrawals made or to be made during the period of time from the respective one aggregated account held in the respective deposit institution by one or more of check, debit card, credit card, ACH transfer, or wire transfer.

51. The system of in claim 47, wherein the no withdrawal designation is applied to one or more of the aggregated accounts in each of a plurality of the deposit institutions to indicate no withdrawal for the respective aggregated account for a given day, a given set of days, or a given week.

* * * * *